US012694213B1

(12) United States Patent
Antebi et al.

(10) Patent No.: US 12,694,213 B1
(45) Date of Patent: Jul. 28, 2026

(54) ENTROPY-BASED SET BLOCK DECODING UTILIZING AN ADAPTIVE ENTROPY THRESHOLD

(71) Applicant: Intuit Inc., Mountain View, CA (US)

(72) Inventors: Sagiv Antebi, Tel Aviv (IL); Matan Vetzler, Givat-Shmuel (IL); Shai Ardazi, Petach-Tikva (IL); Ofir Ben Shoham, Givatayim (IL)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 19/424,021

(22) Filed: Dec. 17, 2025

(51) Int. Cl.
*G06F 40/284* (2020.01)
(52) U.S. Cl.
CPC .................................. *G06F 40/284* (2020.01)
(58) Field of Classification Search
CPC ..................................................... G06F 40/284
See application file for complete search history.

(56) References Cited

U.S. PATENT DOCUMENTS

| | | | |
|---|---|---|---|
| 2022/0214863 A1* | 7/2022 | Clement | G06F 8/44 |
| 2023/0119108 A1* | 4/2023 | Volkovs | G06N 3/09 |
| | | | 706/12 |

OTHER PUBLICATIONS

Gat et al., "Set Block Decoding is a Language Model Inference Accelerator.", arXiv:2509.04185, Sep. 4, 2025, 19 Pages.

* cited by examiner

*Primary Examiner* — Ibrahim Siddo
(74) *Attorney, Agent, or Firm* — Dinsmore & Shohl LLP

(57) ABSTRACT

Certain aspects of the disclosure provide techniques for language model token prediction. A method generally includes processing an input token sequence to generate, for each respective token position of a plurality of token positions in an output token sequence: a probability distribution for a set of candidate output tokens associated with the respective token position; and an entropy score based on the probability distribution; for each respective token position, determining whether the entropy score satisfies a current adaptive entropy threshold, which is based on the entropy score associated with each respective token position; based on the determination for each respective token position, performing a decoding operation comprising: a set block decoding operation or a single-token decoding operation to generate one or more output tokens that correspond to one or more token positions; and generating a first version of the output token sequence including the one or more output tokens.

20 Claims, 9 Drawing Sheets

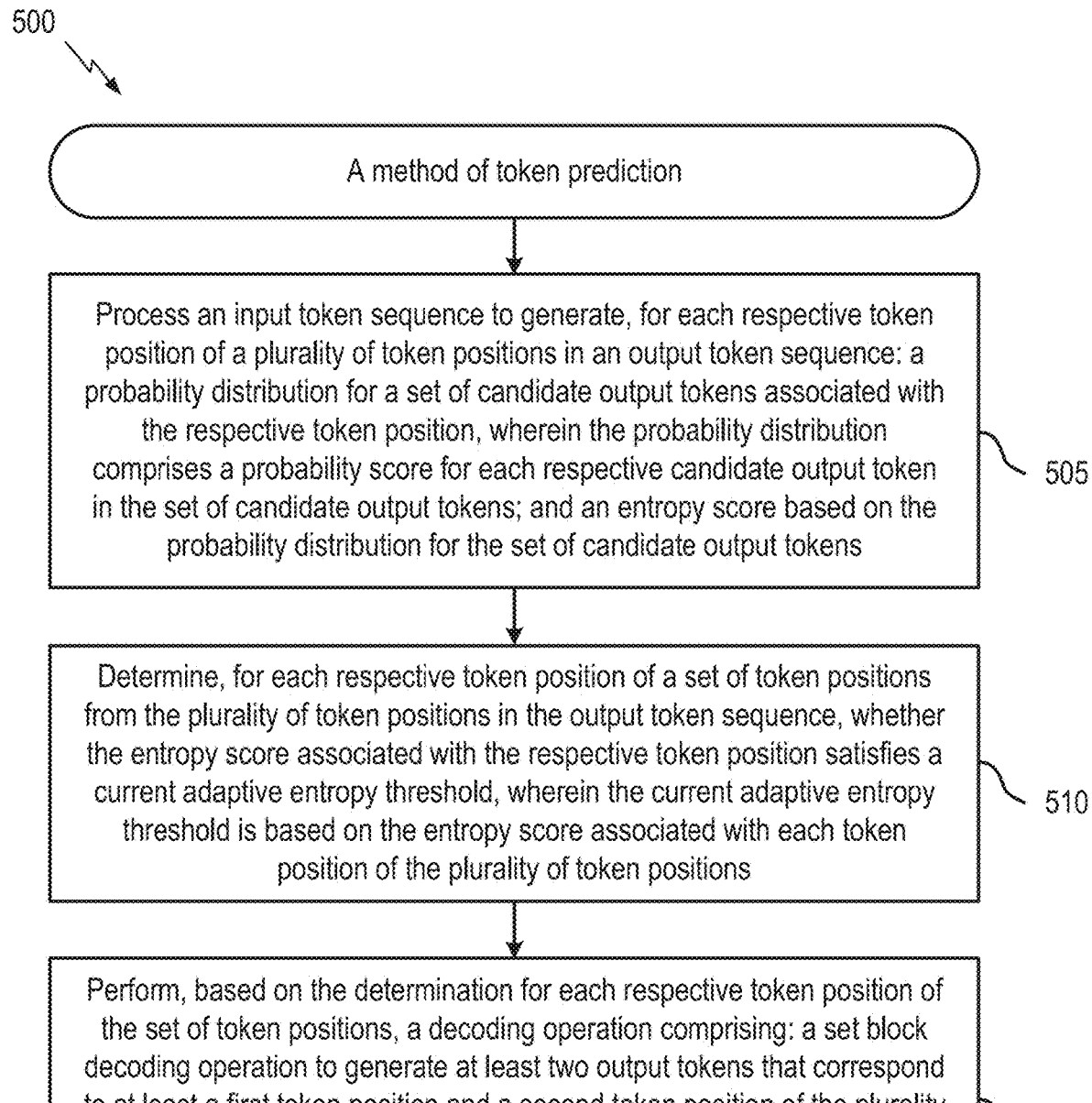

500

A method of token prediction

Process an input token sequence to generate, for each respective token position of a plurality of token positions in an output token sequence: a probability distribution for a set of candidate output tokens associated with the respective token position, wherein the probability distribution comprises a probability score for each respective candidate output token in the set of candidate output tokens; and an entropy score based on the probability distribution for the set of candidate output tokens

505

Determine, for each respective token position of a set of token positions from the plurality of token positions in the output token sequence, whether the entropy score associated with the respective token position satisfies a current adaptive entropy threshold, wherein the current adaptive entropy threshold is based on the entropy score associated with each token position of the plurality of token positions

510

Perform, based on the determination for each respective token position of the set of token positions, a decoding operation comprising: a set block decoding operation to generate at least two output tokens that correspond to at least a first token position and a second token position of the plurality of token positions in the output token sequence; or a single-token decoding operation to generate a single output token that corresponds to the first token position

515

Generate a first version of the output token sequence including the at least two output tokens or the single output token

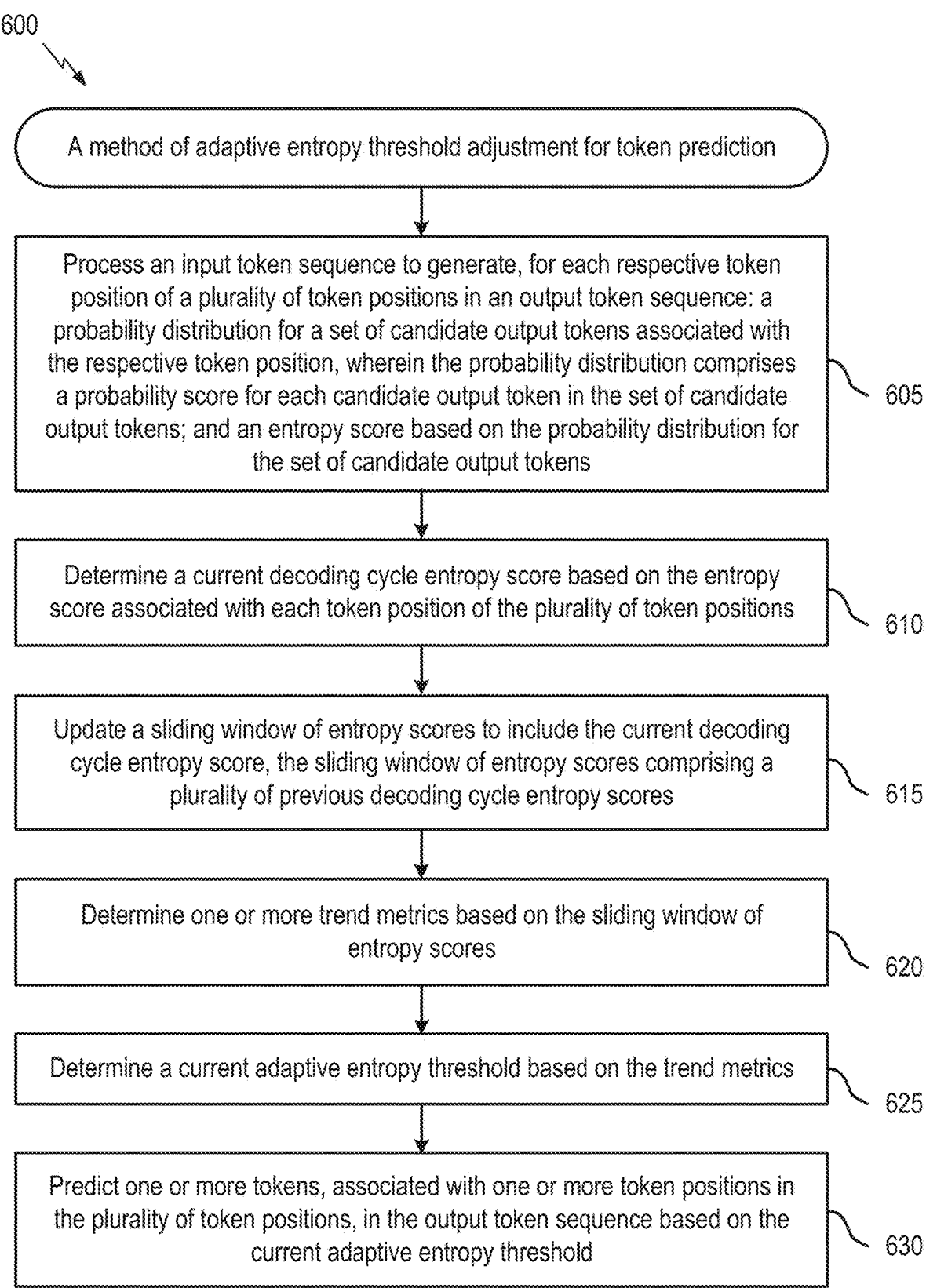

A method of adaptive entropy threshold adjustment for token prediction

Process an input token sequence to generate, for each respective token position of a plurality of token positions in an output token sequence: a probability distribution for a set of candidate output tokens associated with the respective token position, wherein the probability distribution comprises a probability score for each candidate output token in the set of candidate output tokens; and an entropy score based on the probability distribution for the set of candidate output tokens — 605

Determine a current decoding cycle entropy score based on the entropy score associated with each token position of the plurality of token positions — 610

Update a sliding window of entropy scores to include the current decoding cycle entropy score, the sliding window of entropy scores comprising a plurality of previous decoding cycle entropy scores — 615

Determine one or more trend metrics based on the sliding window of entropy scores — 620

Determine a current adaptive entropy threshold based on the trend metrics — 625

Predict one or more tokens, associated with one or more token positions in the plurality of token positions, in the output token sequence based on the current adaptive entropy threshold — 630

FIG. 6

ENTROPY-BASED SET BLOCK DECODING UTILIZING AN ADAPTIVE ENTROPY THRESHOLD

BACKGROUND

Field

Aspects of the present disclosure relate to language model-based token prediction.

Description of Related Art

Recent advances in artificial intelligence (AI) have enabled the widespread adoption of language models for the performance of natural language processing (NLP) tasks, such as generating text (e.g., synthetic text), answering user queries in a conversational manner, translating text from one language to another, and/or the like. A "language model" is a type of machine learning (ML) model trained on large volumes of text to learn the structure, meaning, and usage patterns of language. Language models make it possible for software to "understand" typical human speech or written content and respond to it by, in some cases, generating human-understandable responses through natural language generation (NLG).

Generating text with a language model is an autoregressive process that involves the language model predicting a next token given an input sequence of tokens (e.g., in some cases, including token(s) that were previously predicted by the language model). More specifically, given an input sequence of tokens, a language model may assign probabilities to each candidate output token in its vocabulary, where a probability assigned to a candidate output token represents a likelihood that the candidate output token is most likely to logically follow next in the sequence. The language model may select the next token by sampling according to these probabilities. For example, the language model may select, as the next token in the sequence, a candidate output token associated with a greatest probability (e.g., indicating that the token is the most likely and appropriate next token in the sequence).

In the context of language models, "tokens" may refer to units of text that the models process and generate. Tokens can represent individual characters, words, subwords, or even larger linguistic units, depending on the specific tokenization (e.g., segmentation of text into meaningful units to capture its semantic and syntactic structure) approach used. Tokens act as a bridge between text data and the numerical representations with which language models are able to use. A "candidate output token" refers to a token that may be generated by a language model as a potential next token in a text sequence.

SUMMARY

Certain aspects provide a method of token prediction. The method includes processing an input token sequence to generate, for each respective token position of a plurality of token positions in an output token sequence: a probability distribution for a set of candidate output tokens associated with the respective token position, wherein the probability distribution comprises a probability score for each respective candidate output token in the set of candidate output tokens an entropy score based on the probability distribution for the set of candidate output tokens; determining, for each respective token position of a set of token positions from the plurality of token positions in the output token sequence, whether the entropy score associated with the respective token position satisfies a current adaptive entropy threshold, wherein the current adaptive entropy threshold is based on the entropy score associated with each token position of the plurality of token positions; performing, based on the determination for each respective token position of the set of token positions, a decoding operation comprising: a set block decoding operation to generate at least two output tokens that correspond to at least a first token position and a second token position of the plurality of token positions in the output token sequence a single-token decoding operation to generate a single output token that corresponds to the first token position; and generating a first version of the output token sequence including the at least two output tokens or the single output token.

Certain aspects provide a method of adaptive entropy threshold adjustment for token prediction. The method includes processing an input token sequence to generate, for each respective token position of a plurality of token positions in an output token sequence: a probability distribution for a set of candidate output tokens associated with the respective token position, wherein the probability distribution comprises a probability score for each candidate output token in the set of candidate output tokens an entropy score based on the probability distribution for the set of candidate output tokens; determining a current decoding cycle entropy score based on the entropy score associated with each token position of the plurality of token positions; updating a sliding window of entropy scores to include the current decoding cycle entropy score, the sliding window of entropy scores comprising a plurality of previous decoding cycle entropy scores; determining one or more trend metrics based on the sliding window of entropy scores; determining a current adaptive entropy threshold based on the trend metrics; and predicting one or more tokens, associated with one or more token positions in the plurality of token positions, in the output token sequence based on the current adaptive entropy threshold.

Other aspects provide processing systems configured to perform the aforementioned methods as well as those described herein; non-transitory, computer-readable media comprising instructions that, when executed by a processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

DESCRIPTION OF THE DRAWINGS

The appended figures depict certain aspects and are therefore not to be considered limiting of the scope of this disclosure.

FIG. 5 depicts an example method for token prediction.

FIG. 6 depicts an example method of adaptive entropy threshold adjustment for token prediction.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
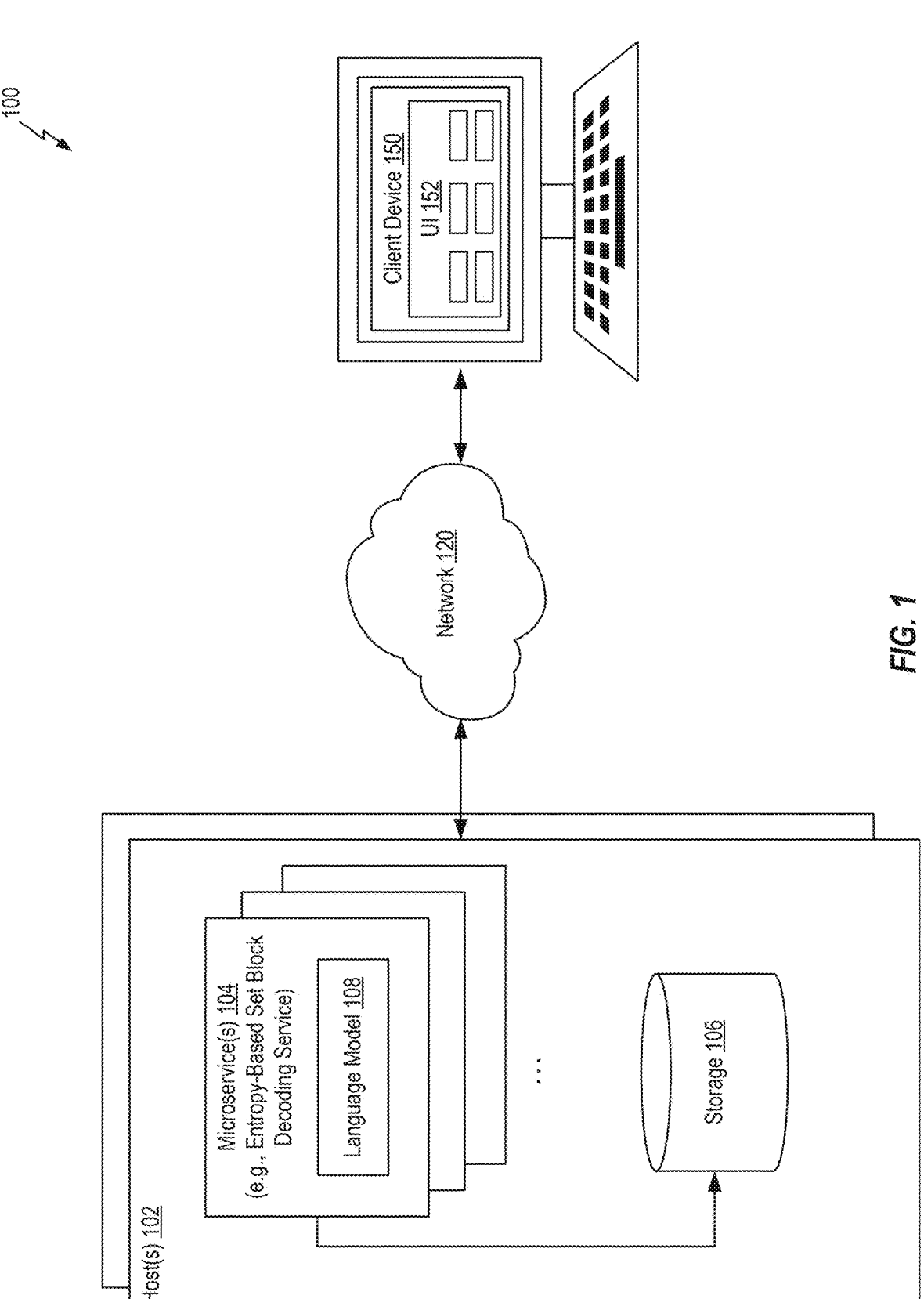
FIG. 1 is a schematic system diagram illustrating an example processing system supporting microservices interconnected via a network.

Language models conventionally generate text one token at a time in an autoregressive manner, where each newly generated token is conditioned on one or more previously generated tokens. This next-token prediction paradigm may deliver high-quality results by maintaining the causal relationship between tokens. However, such prediction may be computationally expensive as each token generation step may involve performing a forward pass through a language model (e.g., resulting in repeated memory accesses to obtain cached values), making the process slow and resource intensive. Set block decoding (SBD) is one approach that aims to address these inefficiencies, while also preserving accuracy.

Set block decoding refers to a method that may be used to accelerate inference in language models by enabling parallel generation of multiple future tokens. For example, token generation may occur in blocks rather than strictly token-by-token. As used herein, a "block" may refer to a contiguous sequence of tokens processed together during inferencing (e.g., output generation) by a language model. In certain aspects, set block decoding introduces bidirectional masked attention within blocks of future tokens while preserving autoregressive attention for past tokens. Autoregressive attention helps to ensure that each token is influenced by prior token(s), maintaining the causal relationship necessary for sequential prediction. Bidirectional masked attention allows attention to be applied in both forward and backward directions within a sequence, while masking certain tokens to prevent them from influencing predictions. Bidirectional masked attention may enable simultaneous processing of visible tokens and help to ensure contextual relevance during inference. Set block decoding may significantly reduce computational overhead, in some cases achieving up to three to five times fewer forward passes during inferencing, without requiring architectural changes and/or additional parameters.

A key technical challenge of set block decoding lies in identifying which tokens can be decoded in parallel without compromising the accuracy and coherence of the generated tokens. As such, a language model may need to evaluate the dependencies between tokens within a block to ensure that parallel decoding does not violate syntactic or semantic relationships. For example, certain tokens may rely heavily on the context provided by preceding tokens, making them unsuitable for parallel decoding. Addressing this challenge may involve implementing mechanism(s) to dynamically assess token uncertainty and interdependencies, such as to help ensure that parallel decoding maintains the integrity of the output.

One example mechanism that quantifies uncertainty at each future token position (simply referred to herein as "token position") uses an entropy measure and an entropy threshold to regulate parallel decoding. Specifically, for each respective future token position, a language model may generate a probability distribution over candidate output tokens associated with the respective future token position and compute an entropy score from this probability distribution. Future token positions associated with an entropy score that satisfy the entropy threshold (e.g., entropy score < entropy threshold), indicating low entropy, may be prioritized for parallel decoding. Conversely, future token positions associated with an entropy score that do not satisfy the entropy threshold (e.g., entropy score ≥ entropy threshold), indicating high entropy, may be better suited for conservative single-token decoding.

In this context, an "entropy score" may serve as a measure of the language model's uncertainty (e.g., entropy) about which candidate output token (e.g., in its vocabulary) it may generate for a future token position. A "high entropy score" may indicate low language model confidence (e.g., high entropy) with respect to its output and represent a measure for a more uniform probability distribution over candidate output tokens. For example, high entropy may occur when a language model is prompted with an open-ended question such as, "my favorite fruit is," where many candidate output tokens are plausible and the language model's uncertainty is high. A "low entropy score," on the other hand, may reflect high language model confidence (e.g., low entropy) and reflect a measure for a sharply peaked probability distribution over candidate output tokens. Low entropy is typical in deterministic token generation scenarios (e.g., including factual statements, common phrases, etc.), such as, "the capital of France is," where the language model is highly confident that "Paris" is the correct next token in the sequence.

For conventional set block decoding, the entropy threshold may be static (e.g., fixed prior to inference) and uniformly applied to determine which token positions qualify for parallel decoding. While straightforward to implement, the use of a static entropy threshold imposes a rigid speed versus accuracy trade-off that often fails to adapt to the dynamic uncertainty profiles encountered during inferencing. For example, a static entropy threshold that is set too low may restrict parallel decoding to only the most confident token positions, preserving accuracy but significantly reducing speed benefits, often approaching the behavior of next-token decoding. Conversely, a static entropy threshold set too high may permit parallel decoding for many token positions even under elevated uncertainty, increasing the risk of inaccurate token predictions that propagate errors, degrade coherence, and/or necessitate costly corrections.

Moreover, an optimal entropy threshold may be sensitive to the nature of the task and/or context. For example, fluent narrative text may tolerate aggressive parallelization, whereas mathematical reasoning and/or syntax-constrained code generation may demand stricter gating (e.g., using a lower entropy threshold to control which future token positions are allowed to be decoded in parallel). Further, rapid context shifts, such as transitioning from descriptive text to numeric calculations, may render a static entropy threshold ineffective. Attempting to manually tune the entropy threshold for specific tasks, language models, and/or deployments may introduce operational complexity, inconsistent performance, and/or poor generalization across domains, undermining the potential of set block decoding for fast and reliable inference.

Aspects described herein overcome the aforementioned technical problems and improve upon the state of the art by introducing techniques for entropy-based set block decoding utilizing an adaptive entropy threshold. Instead of relying on a static entropy threshold, the techniques described herein may be used to dynamically adjust an adaptive entropy threshold, used for set block decoding at each decoding step, based on the evolving uncertainty profile of a language model during inferencing. As used herein, a "decoding step," or "decoding cycle," may refer to a single iteration or operation during the inferencing process of a language model, where the language model generates or predicts one or more next tokens in a sequence. For example, in certain aspects, entropy trends of a language model may be analyzed by evaluating changes in language model uncertainty over successive decoding steps and deriving trend metrics, such as slope and/or variance, to inform threshold adjustments. When the trend metrics indicate stability and low language model uncertainty, the adaptive entropy threshold may be increased to allow more token positions to be decoded in parallel, improving efficiency. Conversely, when the trend metrics signal rising language model uncertainty, the adaptive threshold may be decreased to restrict parallel decoding, ensuring accuracy and coherence in the generated outputs. For example, in fluent text generation, the adaptive entropy threshold may be elevated for common words and punctuation, while in syntax-sensitive code generation, the adaptive entropy threshold may be lowered to avoid errors. This adaptive entropy threshold adjustment may occur in real-time, ensuring consistent decision-making across decoding steps. As used herein, "real-time" may refer to the immediate or near-instantaneous adjustment of an entropy threshold during each decoding cycle, prior to performing set block decoding or single-token decoding for the specific decoding cycle, such as to ensure consistent decision-making and token prediction without delays.

A system capable of performing entropy-based set block decoding, utilizing an adaptive entropy threshold, may include an entropy monitor to track language model uncertainty (e.g., token-level uncertainty), an adaptive scheduler to modulate the adaptive entropy threshold, and an entropy-bounded sampler to select tokens for decoding, such as a block of tokens in multiple token positions for parallel decoding. An example system including an entropy monitor, an adaptive schedule, and an entropy-bounded sampler is depicted and described with respect to FIG. 3. This system eliminates the need for manual threshold tuning and balances decoding speed with reliability across diverse applications, such as conversational AI, precise mathematical computations, and/or code generation.

The techniques described herein provide notable technical advantages over conventional solutions, such as improved efficiency in language model inferencing and the ability to dynamically adjust decoding thresholds based on entropy trends. By leveraging adaptive entropy thresholds, the techniques presented herein address technical challenges associated with static threshold approaches, such as suboptimal decoding speed and reduced accuracy in uncertain contexts. For example, the techniques described herein enable real-time analysis of entropy trends during inference, allowing for the dynamic adjustment of entropy thresholds to balance efficiency and accuracy. This functionality facilitates faster decoding in stable contexts while preserving coherence and fidelity in unstable contexts. The technical effects of these techniques enable language models to operate more efficiently, reducing computational overhead and improving scalability in high-demand environments.

Notably, the adaptive entropy threshold techniques described herein can further improve the function of any existing application that relies on language model inference for generating outputs. For example, any application that processes natural language inputs, generates predictive text, or performs translation tasks can benefit from the dynamic adjustment capabilities provided by these techniques. In some cases, the entropy threshold can be adjusted dynamically during inferencing, allowing the application to optimize decoding efficiency while maintaining accuracy. For instance, when the system detects low uncertainty in token predictions, the threshold is increased to enable faster parallel decoding. Conversely, when uncertainty rises, the threshold is decreased to ensure coherence and fidelity in the generated outputs. These technical effects allow applications to deliver faster and more reliable results, enhancing user experience and reducing computational demands.

A language model implementing these techniques, described herein, integrates adaptive entropy threshold adjustments directly into its inferencing process. This dynamic capability allows the language model to analyze entropy trends in real-time and optimize decoding efficiency and accuracy based on evolving uncertainty profiles. By departing from static entropy threshold approaches, the language model exhibits unique functionality that addresses technical challenges inherent in conventional systems, ensuring improved performance and reliability across diverse applications.

Example System Implementing an Entropy-Based
Set Block Decoding Service

FIG. 1 depicts an example system 100 supporting a plurality of microservices 104 (e.g., software-defined services, which in some cases, may be cloud-native). As shown in FIG. 1, system 100 includes one or more client devices 150 (collectively referred to herein as "client devices 150") and one or more hosts 102 (collectively referred to herein as "hosts 102"). A network 120 may provide connectivity between client device 150 and host 102. Network 120 may include, for example, a direct link, a local area network (LAN), a wide area network (WAN) (such as the Internet), another type of network, or a combination of one or more of these networks.

Host 102 may be geographically co-located servers on the same rack or on different racks in any arbitrary location in a data center. Host 102 may be implemented on a server-grade hardware platform. Host 102 or the hardware platform may include components of a computing device, such as one or more processors (e.g., central processing units (CPUs)), one or more memories (e.g., random access memory (RAM)), one or more network interfaces (e.g., physical network interfaces (PNICs)), storage 106, and/or other components, as described elsewhere herein. Storage 106 and other example components of an apparatus that may implement host 102 are described elsewhere herein.

Host 102 in system 100 may host a set of one or more microservices 104 (collectively referred to herein as "microservice(s) 104"). The microservice(s) 104 may be deployed using virtual machines (VMs) and/or container(s) implemented on host 102). For example, host 102 may implement a hypervisor (not shown) that abstracts processor, memory, storage, and networking resources of host 102's hardware platform). Generally, a microservice 104 is a loosely coupled and independently deployable service or software that, alone or in combination with one or more other microservices 104, may make up an application. Microservice(s) 104 may enable segmented, granular level functionalities within a larger system infrastructure. A reference to a single microservice 104 can encompass multiple microservices 104, unless context indicates otherwise.

Client device 150 may include a user interface (UI) 152. UI 152 may be usable to communicate with microservice 104 via network 120. For example, communication between client devices 150 and a microservice 104 may be facilitated by one or more application programming interfaces (APIs). An API is a set of rules and protocols that allows different software applications to communicate and share data with each other. Non-exhaustive examples of client devices 150 may include a smartphone, a personal computer, a tablet, or a laptop computer. In some examples, microservice 104 may interact with another microservice, an application, a host, or the like, via network 120.

As shown in FIG. 1, in certain aspects, microservice 104 implements an entropy-based set block decoding service, which is any network 120 accessible service that dynamically adjusts entropy thresholds during decoding to optimize efficiency and accuracy. The entropy-based set block decoding service may include a language model 108. The entropy-based set block decoding service may analyze uncertainty profiles and entropy trends of a language model to determine optimal adaptive entropy thresholds for decoding, such as to allow for, in some cases, the parallel decoding of multiple tokens (e.g., a block of tokens corresponding to two more future token positions), enabling faster and more reliable language model outputs. A microservice 104, or a host 102 that implements a microservice 104, may be referred to as an apparatus." A microservice 104, or a host 102 that implements a microservice 104, may be referred to as an apparatus.

Though FIG. 1 depicts host 102, storage 106, and client device 150 as single devices for ease of illustration, host 102, storage 106, and/or client device 150 may be embodied in a variety of forms. Further, though FIG. 1 depicts only one host 102 and one client device 150, other examples may include a different number of hosts 102 and/or client devices 150. Client devices 150 may use any combination of microservices 104 on any host 102 where microservices 104 are deployed.

Example System for Token Prediction

Figure 2:
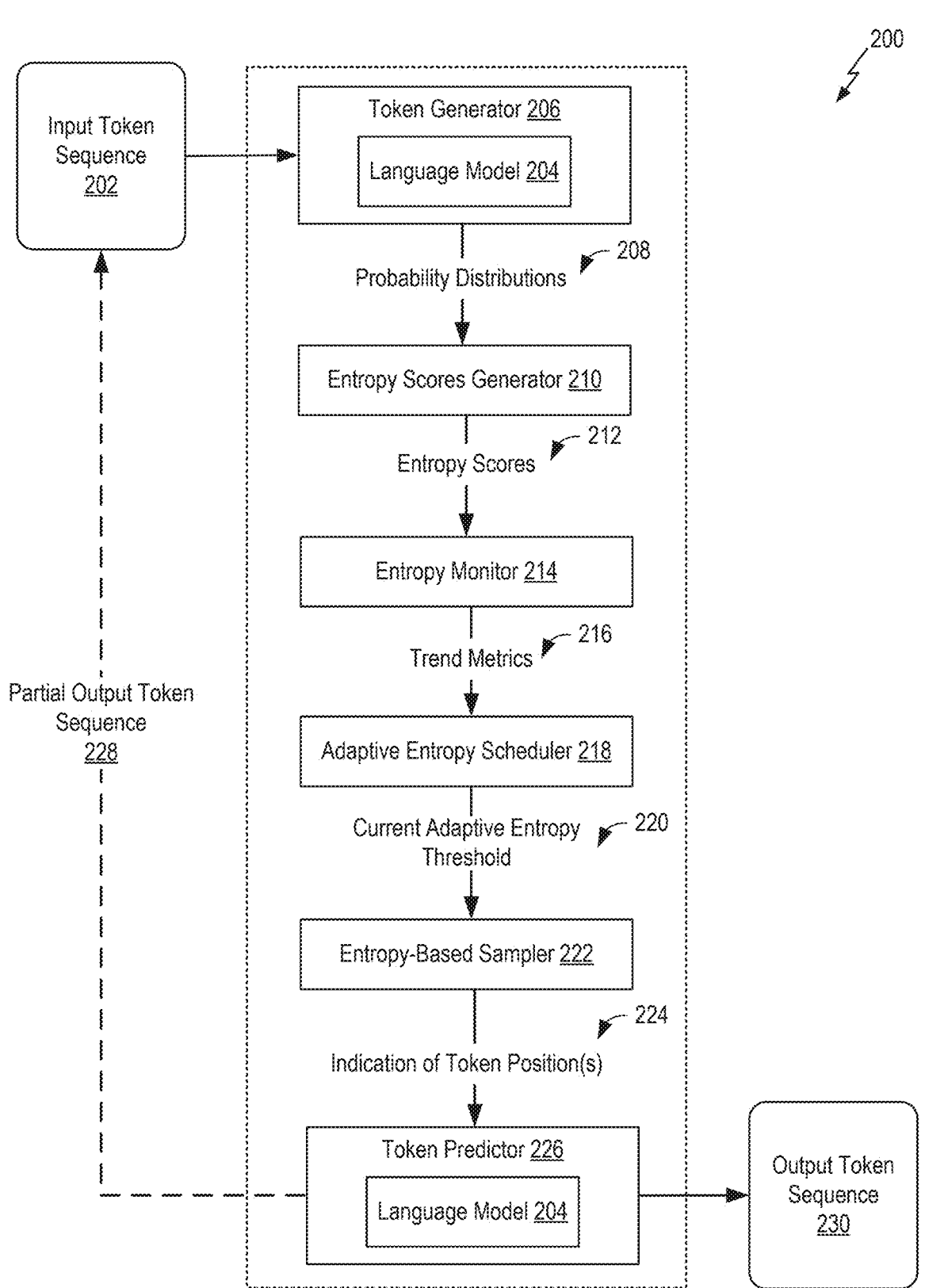
FIG. 2 depicts an example system for token prediction using set block decoding with an adaptive entropy threshold.

FIG. 2 depicts an example system 200 for token prediction using set block decoding with an adaptive entropy threshold. System 200 is configured to dynamically adjust an adaptive entropy threshold, such as to optimize token generation accuracy and speed during token prediction for an input token sequence 202.

As shown in FIG. 2, system 200 includes a token generator 206, an entropy scores generator 210, an entropy monitor 214, an adaptive entropy scheduler 218, an entropy-based sampler 222, and a token predictor 226 to perform token prediction. Further, as shown, token generator 206 and token predictor 226 may implement a language model 204. In certain aspects, the language model 204 may comprise a so-called large language model (LLM). An LLM is a type of language model that has a large number of parameters, such a language model with greater than 100 billion parameters (although, it is noted, that the number of parameters generally associated with an LLM may change over time).

Input token sequence 202 may represent a user query, a prompt, and/or any sequence of token(s) provided to system 200 (and more specifically, language model 204) for processing. For example, input token sequence 202 may comprise a question, such as "what is the capital of Texas?," a command or instructions, such as "tell me my favorite tropical fruit," or a partially completed sentence, such as "the tallest mountain above sea level is." The input token sequence 202 may be provided to system 200 to generate token(s) (e.g., output token(s)) (e.g., via language model 204) in response to the input token sequence 202. In certain aspects, the input token sequence 202 includes only tokens provided by a user. In certain aspects, the input token sequence 202 includes tokens provided by a user and one or more tokens previously generated by system 200, via language model 204, during a previous decoding cycle. For example, the language model 204 may receive, as input (e.g., such as from a user via a user interface, such as UI 152(1) and/or UI 152(2) in FIG. 1), tokens "the tallest mountain" and generate tokens "above," "sea," "level," and "is" during previous decoding cycle(s), such that for a subsequent decoding cycle the input token sequence 202 includes tokens "the tallest mountain above sea level is."

Token generator 206, utilizing language model 204, processes the input token sequence 202 to generate probability distributions 208 for candidate output tokens at multiple future token positions. For example, language model 204 may process the input token sequence 202, during token generation, by partitioning the input token sequence 202 into individual tokens and analyzing their context to predict the most appropriate next tokens (e.g., corresponding to future token positions) in the token sequence. For each token position, language model 204 may generate a probability distribution 208 for a vocabulary of candidate output tokens. For example, when processing an input token sequence 202, language model may generate (1) a first probability distribution 208 for the vocabulary of candidate output tokens in a first token position after the input token sequence 202, (2) a second probability distribution 208 for the vocabulary of candidate output tokens in a second token position after the input token sequence and after the first token position, (3) a third probability distribution 208 for the vocabulary of candidate output tokens in a third token position after the input token sequence, the first token position, and the second token position, and so on (e.g., [input token sequence][first token position][second token position][third token position] etc.).

The vocabulary of candidate output tokens may include a finite, defined set of tokens learned by the language model 204 during training, and which may be generated by language model 204 based on input token sequence 202. A probability distribution 208, generated for a future token position, may be based on a probability score assigned, by language model 204, to each candidate output token in the vocabulary for that particular future token position. A probability score assigned to a specific candidate output token may represent a likelihood or confidence that the particular candidate output token is a most appropriate token at the particular future token position, given the input token sequence 202 (and/or token(s) of one or more prior token positions). Thus, the probability score assigned to the specific candidate output token, for the particular future token position, may reflect both the syntactic and semantic relevance of the particular candidate output token to the input token sequence 202. A candidate output token with a probability score higher than all other candidate tokens for a specific future token position may be considered the token that the language model predicts as the most appropriate or accurate representation for that position based on the input token sequence.

In certain aspects, the probability score assigned to a particular candidate output token x (e.g., for a particular future token position) may be represented as $P_{LM}(x|x_{<t})$, where $x_{<t}$ represents the input token sequence 202. For example, in certain aspects, input token sequence 202 may be represented as $x_{<t}=x_1, \ldots, x_{t-1}$. The input token sequence 202 may include $t-1$ tokens from a vocabulary, V, of language model 204.

Entropy scores generator 210 processes the probability distributions 208 generated for each future token position to generate entropy scores 212. For instance, in an example case where token generator 206 generates three probability distributions 208 for three future token positions, entropy scores generator 210 may generate three entropy scores 212 based on the three probability distributions 208, one for each future token position. An "entropy score" generated by entropy scores generator 210 for a future token position may serve as a measure of language model 204's uncertainty about which candidate output token (e.g., in its vocabulary) it may generate for the future token position, such as based on the input token sequence 202. A high entropy score, determined for a future token position, may indicate low language model 204 confidence with respect to its output for that future token position (e.g., language model 204 has assigned similar probability scores to many of its candidate output tokens for that future token position). On the other hand, a low entropy score, determined for a future token position, may indicate high language model 204 confidence with respect to its output for that future token position (e.g., language model 204 has assigned a probability score to one of its candidate output tokens that is significantly greater than the probability scores assigned to its other candidate output tokens for that future token position).

In certain aspects, entropy scores 212 may be generated by entropy scores generator 210 by applying Shannon's entropy formula to probability distributions 208 to generate the entropy scores 212 (He). For example, entropy scores generator may apply Shannon's entropy formula to a probability distribution for each future token position to generate an entropy score 212 for each future token position. Shannon's entropy formula may be given as:

$$H_t = -\sum p_{LM}(x \mid x_{<t})\log p_{LM}(x \mid x_{<t})$$

where $P_{LM}(x|x_{<t})$ represents the probability score assigned to a particular candidate output token x, at a particular future token position, as described above.

Entropy monitor 214 may utilize entropy scores 212, generated for the future token positions, to calculate a current decoding cycle entropy score. The "current decoding cycle entropy score" may refer to a single aggregated entropy score calculated for the specific decoding cycle. In certain aspects, entropy monitor 214 may compute the current decoding cycle entropy score as a mean of entropy scores 212. In certain aspects, entropy monitor 214 may compute the current decoding cycle entropy score as a median of entropy scores 212. In certain aspects, entropy monitor 214 may compute the current decoding cycle entropy score by computing a weighted aggregation of the entropy scores 212.

Entropy monitor 214 may add the current decoding cycle entropy score to a sliding window, which tracks previous decoding cycle entropy scores. As used herein, a "sliding window" may refer to a fixed-length sliding window of size W (e.g., W=4), updated each decoding cycle to include the current decoding cycle entropy score and a plurality of immediately preceding decoding cycle entropy scores, from which trend metrics are computed. For example, following the addition, an example sliding window may include [Previous decoding cycle (x−3) entropy score, previous decoding cycle (x−2) entropy score, previous decoding cycle (x−1) entropy score, current decoding cycle (x) entropy score]. Using the values in the sliding window, the entropy monitor 214 may determine trend metrics 216, such as slope and/or variance, which reflect changes in language model 204 uncertainty over time. As described below, these trend metrics 216 may be used to inform (1) selection of an adaptive entropy threshold or (2) adjustment(s) to a previous adaptive entropy threshold (e.g., used for a previous decoding cycle), such as to help achieve efficient and accurate token prediction.

Adaptive entropy scheduler 218 (simply referred to herein as "scheduler 218") may dynamically select and/or adjust an adaptive entropy threshold for the current decoding cycle (referred to herein as "current adaptive entropy threshold 220") based on trend metrics 216, such as to optimize performance and efficiency in decoding by language model 204. For example, in certain aspects, scheduler 218 determines the current adaptive entropy threshold 220 based on a mapping (e.g., an existing mapping) between trend metrics 216 and the current adaptive entropy threshold 220, enabling precise threshold selection in response to observed trends.

In certain aspects, scheduler 218 determines the current adaptive entropy threshold 220 based on one or more rules. In certain aspects, scheduler 218 evaluates whether one or more of the trend metrics 216 (e.g., the slope and/or variance) satisfy one or more thresholds (e.g., a slope threshold and/or a variance threshold, respectively) and adjusts a previous entropy threshold (e.g., for a previous decoding cycle) by an increment, when the trend metric(s) satisfy the threshold(s). For example, in some cases where trend metrics 216 includes a slope that exceeds a slope threshold (e.g., represents stable entropy for the language model 204, indicating that language model 204 confidence is stable), the adjustment may include decreasing the previous adaptive entropy threshold. Thus, the current adaptive entropy threshold 220 may be a value that is less than a value of the previous adaptive entropy threshold. This current adaptive entropy threshold 220 may allow more token positions to qualify for set block decoding and thus be decoded in parallel (e.g., allow for more parallelization). Alternatively, in some cases where the trend metrics 216 includes a slope that exceeds the slope threshold (e.g., represents a spike in entropy, indicating that model confidence is decreasing or model uncertainty is increasing), the adjustment may include increasing the previous adaptive entropy threshold. Thus, the current adaptive entropy threshold 220 may be a value that is less than a value of the previous adaptive entropy threshold. This current adaptive entropy threshold 220 may allow fewer token positions to qualify for set block decoding and thus be decoded in parallel.

In certain aspects, scheduler 218 incorporates decoding feedback from previous cycles, including entropy scores, latency metrics, and/or accuracy metrics, to select the current adaptive entropy threshold 220 and/or adjust a previous adaptive entropy threshold to determine the current adaptive entropy threshold 220. Each metric may influence the adaptive entropy threshold in a different way. For example, where the metric is entropy trend (e.g., mean, median, and/or slope), and entropy is rising (e.g., model is becoming more uncertain), the adaptive entropy threshold may be reduced, making decoding more conservative. As another example, where the metric is latency, and the latency indicates that recent decoding cycles are too slow, the adaptive entropy threshold may be increased, such as to expand parallel decoding. Alternatively, if the latency indicates that decoding cycles are efficient/quick enough, then no upward adjustment of the adaptive entropy threshold may be needed. As another example, where the metric is accuracy, and accuracy is decreasing (e.g., errors are increasing), the adaptive entropy threshold may be decreased to reduce aggressive parallel sampling and decoding. Alternatively, if the accuracy remains high, then the adaptive entropy threshold may be allowed to drift upward (e.g., gradually increased). These metrics may bias the adaptive entropy threshold towards speed (e.g., a higher threshold) or accuracy (e.g., a lower threshold), depending on recent decoding behavior.

This feedback-driven approach may utilize reinforcement learning techniques, a method in which an agent learns to make decisions by receiving rewards and/or penalties for actions taken in an environment. By leveraging reinforcement learning, the scheduler 218 may continuously refine its adjustment(s) and/or selection of adaptive entropy thresholds for decoding cycles, helping to achieve adaptability and/or improvement in decoding operations.

Example rewards may be received (1) when an increased adaptive entropy threshold leads to correct multi-token predictions (e.g., fast and accurate), (2) when latency decreases without negatively affecting output quality, and/or the like. Example penalties may be received (1) when an aggressive adaptive entropy threshold causes inaccurate token prediction and/or causes the need for fallback corrections, (2) when latency increases because the adaptive entropy threshold was set to be too low (e.g., overly conservative), and/or the like. These signals may enable a reinforcement learning controller to learn whether increasing and/or decreasing the adaptive entropy threshold improves overall speed-accuracy performance.

Entropy-based sampler 222 (simply referred to herein as "sampler 222") may evaluate the entropy score 212, determined for each future token position, individually against the current adaptive entropy threshold 220 to identify future token position(s) that are eligible for parallel decoding. For example, sampler 222 may compare the entropy score 212 determined for a first future token position to the current adaptive entropy threshold 220, then move to the next future token position and perform the same comparison, continuing this process for a set (e.g. one or more) of future token positions. Token positions having entropy scores 212 that satisfy the current adaptive entropy threshold 220 may be decoded in parallel, while those that do not, may be decoded individually and sequentially (e.g., via multiple decoding cycles). In certain aspects, contiguous token positions, having entropy scores 212 that satisfy the current adaptive entropy threshold 220, be decoded in parallel.

For example, in certain aspects, sampler 222 determines whether the entropy score 212 for the first token position (e.g., next token position after the input token sequence 202) satisfies the current adaptive entropy threshold 220. In a first case, the entropy score 212 for the first token position may not satisfy the current adaptive entropy threshold 220 (e.g., entropy score 212> current adaptive entropy threshold 220); thus, sampler 222 may determine that a single-token decoding operation may be performed to decode a token for the first token position only (e.g., during this decoding cycle).

In a second case, the entropy score 212 for the first token position may satisfy the current adaptive entropy threshold 220 (e.g., entropy score 212< current adaptive entropy threshold 220); thus, sampler 222 may determine whether the entropy score 212 for the second token position (e.g., next token position after the first token position) satisfies the current adaptive entropy threshold 220. The entropy score 212 for the second token position may not satisfy the current adaptive entropy threshold 220 (e.g., entropy score 212> current adaptive entropy threshold 220); thus, sampler 222 may determine that a single-token decoding operation may be performed to decode a token for the first token position only (e.g., during this decoding cycle).

In a third case, the entropy score 212 for the first token position may satisfy the current adaptive entropy threshold 220 (e.g., entropy score 212< current adaptive entropy threshold 220); thus, sampler 222 may determine whether the entropy score 212 for the second token position (e.g., next token position after the first token position) satisfies the current adaptive entropy threshold 220. The entropy score 212 for the second token position may also satisfy the current adaptive entropy threshold 220 (e.g., entropy score 212< current adaptive entropy threshold 220); thus, sampler 222 may determine that a set block decoding operation may be performed to decode tokens for at least the first and second token positions. Other token positions with entropy scores 212 that satisfy the current adaptive entropy threshold 220 may also be decoded in parallel during the set block decoding operation.

The sampler 222 provides an indication of token position(s) 224 that can be decoded together to token predictor 226. Token predictor 226 may use the indication of token position(s) 224 to generate token(s) for the identified position(s). For example, in certain aspects where the indication of token position(s) 224 indicates only the first future token position, token predictor 226 may perform a single-token decoding operation to generate a single output token that corresponds to the first future token position. In certain aspects where the indication of token position(s) 224 indicates at least the first and second future token positions, token predictor 226 may perform a set block decoding operation to generate at least two output tokens that correspond to at least the first future token position and the second future token position (and output token(s) for one or more other indicated token position(s)). Token predictor 226 may utilize language model 204 to generate the output token(s) for the indicated future token position(s).

In certain aspects, the output token(s), generated by token predictor 226 (e.g., via language model 204), may be combined and appended with the input token sequence 202 to generate an output token sequence 230. This may occur in cases where the output token(s) generated by token predictor 226 (e.g., via language model 204) cause the entire sequence to be decoded. Accordingly, based on the generated output token(s), the output token sequence 230 may be produced.

In certain aspects, the output token(s), generated by token predictor 226 (e.g., via language model 204), may be combined into a partial output token sequence 228 (e.g., a version of the output token sequence 230) and used to update the input token sequence 202 for a next decoding cycle. For example, for an input token sequence 202 "my favorite foods include," token predictor 226 may generate output tokens "spaghetti" and "and." Output tokens "spaghetti" and "and" may be combined into a partial output token sequence 228 "spaghetti and" and used to update input token sequence 202 such that the updated input token sequence 202 includes "my favorite foods include spaghetti and" for a next decoding cycle.

Figure 3A:
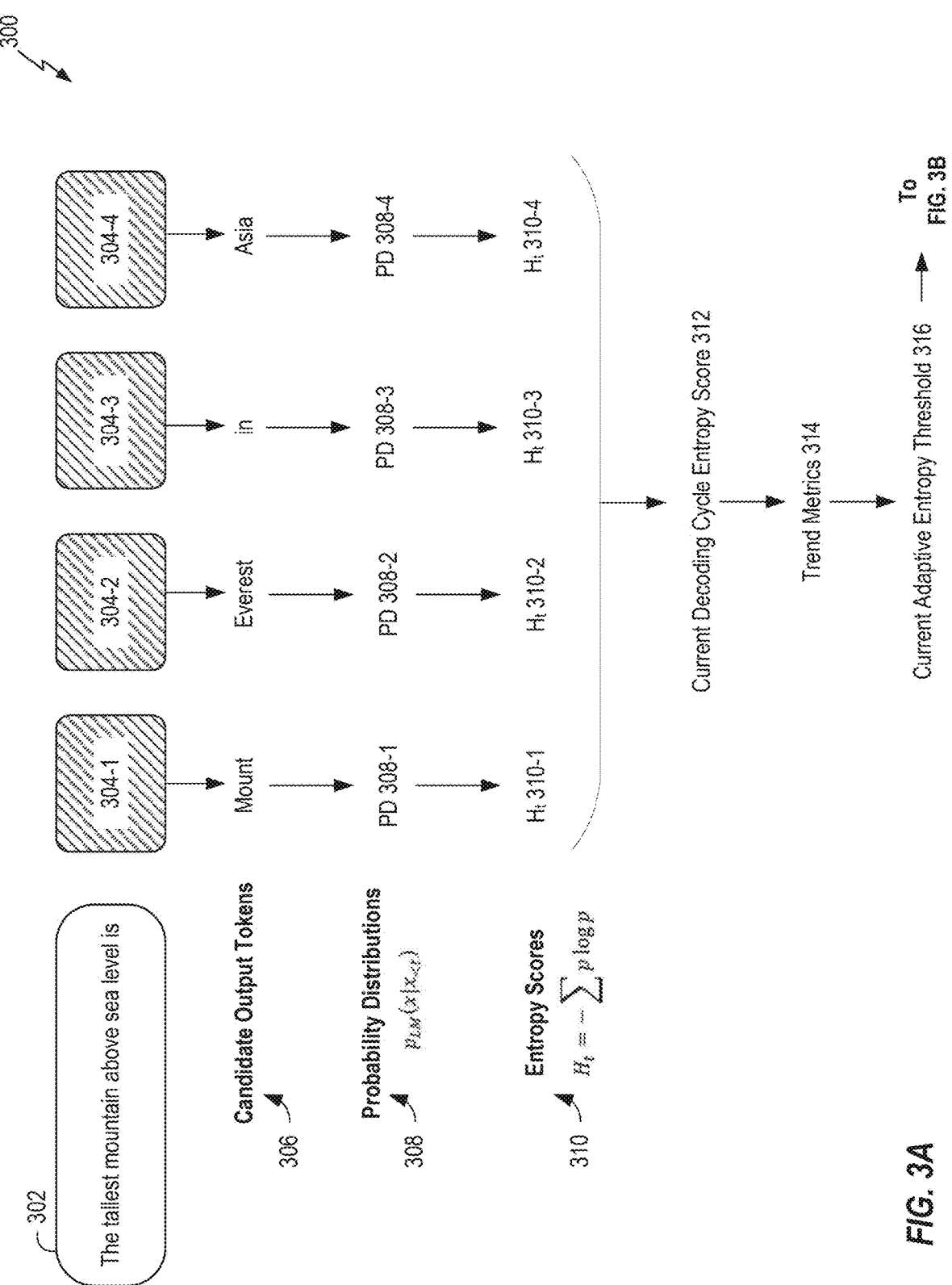
FIG. 3A depicts an example process for adaptive entropy threshold scheduling.

System 200 achieves efficient and accurate token prediction by dynamically adapting to uncertainty trends and optimizing the balance between parallel and sequential decoding. System 200 realizes such advantages by comparing the entropy score 212 of each token future position individually against the current adaptive entropy threshold 220. Future token positions that satisfy the threshold may be decoded in parallel, while those that do not may be decoded sequentially. Example Adaptive Entropy Threshold Scheduling and Token Prediction FIG. 3A depicts an example process 300 for adaptive entropy threshold scheduling. In certain aspects, example process 300 may be used to select and/or adjust an adaptive entropy threshold for token prediction using set block decoding. In certain aspects, example process 300 may be performed by token generator 206, entropy scores generator 210, entropy monitor 214, and adaptive entropy scheduler 218 of system 200 depicted and described with respect to FIG. 2.

Figure 3B:
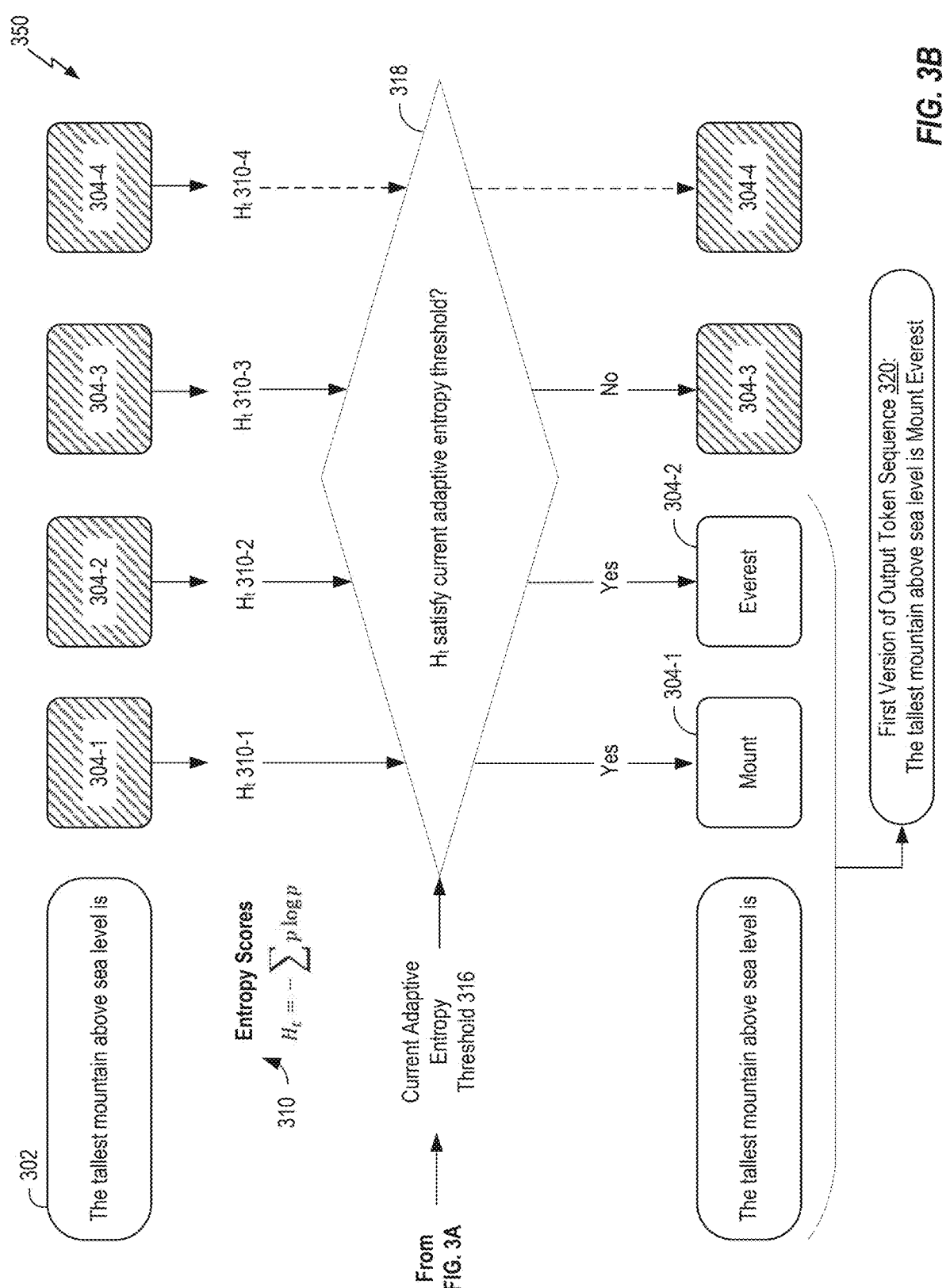
FIG. 3B depicts example token prediction using the adaptive entropy threshold determined in FIG. 3A.

Although not meant to be limiting to this specific example, as shown in FIG. 3A and FIG. 3B, example process 300 may be used to select and/or adjust an adaptive entropy threshold for predicting token(s) based on an input token sequence 302 "the tallest mountain above sea level is."

For example, input token sequence 302 "the tallest mountain above sea level is" may be provided as input by a user. A language model (not shown in FIG. 3), such as language model 204 in FIG. 2, may process the input token sequence 302 and identify four future token positions 304-1, 304-2, 304-3, and 304-4 (collectively referred to herein as "token positions 304") as candidate positions for decoding. For each token position 304, the language model may generate a probability distribution 308-1, 308-2, 308-3, 308-4 (collectively referred to herein as "probability distributions 308"), respectively, which reflects the likelihood of candidate output tokens appearing at respective token positions 304, such as based on the input token sequence 302.

For example, a probability distribution (PD) 308-1 may be generated for a vocabulary of candidate output tokens for token position 304-1, a probability distribution 308-2 may be generated for a vocabulary of candidate output tokens for token position 304-2, a probability distribution 308-3 may be generated for a vocabulary of candidate output tokens for token position 304-3, and a probability distribution 308-4 may be generated for a vocabulary of candidate output tokens for token position 304-4. For token position 304-1, a candidate output token "Mount" may be assigned a highest probability score indicating that the candidate output token "Mount" is the most likely token for that token position 304-1 based on the input token sequence 302. For token position 304-2, a candidate output token "Everest" may be assigned a highest probability score indicating that the candidate output token "Everest" is the most likely token for that token position 304-2 based on the input token sequence 302 and/or a token for token position 304-1. For token position 304-3, a candidate output token "in" may be assigned a highest probability score indicating that the candidate output token "in" is the most likely token for that token position 304-3 based on the input token sequence 302, a token for token position 304-1, and/or a token for token position 304-2. For token position 304-4, a candidate output token "Asia" may be assigned a highest probability score indicating that the candidate output token "Asia" is the most likely token for that token position 304-4 based on the input token sequence 302, a token for token position 304-1, a token for token position 304-2, and/or a token for token position 304-3.

Entropy scores ($H_t$) 310 (also individually referred to herein as "entropy score 310") may be generated from probability distributions 308. For example, an entropy score 310-1 may be generated based on probability distribution 308-1, an entropy score 310-2 may be generated based on probability distribution 308-2, an entropy score 310-3 may be generated based on probability distribution 308-3, and an entropy score 310-4 may be generated based on probability distribution 308-4. In certain aspects, a sharply peaked probability distribution 308 may yield a lower entropy score 310, while a flatter probability distribution 308 may yield a higher entropy score 310. For example, if probability distribution 308-1 places most of its confidence on "Mount," entropy score 310-1 may be low. In another example, if probability distribution 308-3 spreads probability broadly across function words like "in," "the," and "is," entropy score 310-3 may be relatively high.

Entropy scores 310 for token positions 304 under consideration (e.g., being evaluated) in the current decoding cycle, such as entropy scores 310-1 through 310-4 for token positions 304-1 through 304-4, may be used to determine a current decoding cycle entropy score 312. In certain aspects, the current decoding cycle entropy score 312 may represent a mean, a median, or a weighted aggregation of entropy scores 310-1 through 310-4 for token positions 304-1 through 304-4.

Trend metrics 314 may be computed through a series of actions designed to analyze uncertainty trends for the language model. First, a sliding window (not shown in FIG. 3A) may be updated to include the current decoding cycle entropy score 312 alongside a set of previous decoding cycle entropy scores. In certain aspects, to reduce noise or jitter, the sliding window values may optionally undergo smoothing, using techniques such as an exponential moving average. Next, trend metrics 314 may be calculated based on the values in the sliding window. For example, in certain aspects, a slope of the decoding cycle entropy scores within the sliding window may be calculated, such as to capture the rate and/or direction of change in uncertainty. In certain aspects, variance of the decoding cycle entropy scores within the sliding window may be calculated, such as to measure the dispersion and/or spikiness in recent uncertainty levels of the language model.

A current adaptive entropy threshold 316 (e.g., to use for set block decoding when performing token prediction based on input token sequence 302) may be determined based on trend metrics 314. For example, in certain aspects, a mapping between trend metrics 314 and the current adaptive entropy threshold 316 may be used to select the current adaptive entropy threshold 316 based on trend metrics 314. In certain aspects, one or more rules may be applied to adjust a previous adaptive entropy threshold (e.g., for a previous decoding cycle) to obtain the current adaptive entropy threshold 316. In certain aspects, the rules may be applied based on whether the trend metrics 314 satisfy specified criteria. For example, if the slope exceeds a threshold, indicating an entropy spike, a previous adaptive entropy threshold may be decreased to a current adaptive entropy threshold 316, such as to limit parallel decoding and improve accuracy. Conversely, if the slope is less than the threshold, the previous adaptive entropy threshold may be increased to a current adaptive entropy threshold 316, such as to enable greater parallelization. In certain aspects, variance may help to distinguish between a real trend (e.g., stable entropy but rising or falling) and noise (e.g., unstable entropy), thereby acting as a stabilizer as to how much an adaptive entropy threshold is increased and/or decreased. In certain aspects, decoding feedback, such as previous entropy scores, latency metrics, and/or accuracy metrics, may be used to determine a threshold adjustment to be applied to a previous adaptive entropy threshold (e.g., to increase or decrease the previous adaptive entropy threshold by an increment to obtain current adaptive entropy threshold 316). In certain aspects, bounds and/or hysteresis may be applied to prevent oscillation and constrain aggressiveness in threshold adjustments.

FIG. 3B depicts example token prediction 350 using the current adaptive entropy threshold determined in FIG. 3A. In certain aspects, example token prediction 350 may be performed by entropy-based sampler 222 and token predictor 226 of system 200, depicted and described with respect to FIG. 2, such as to generate tokens for input token sequence 302 "the tallest mountain above sea level is" (e.g., introduced in FIG. 3A).

As shown in FIG. 3B, entropy scores 310-1, 310-2, 310-3, 310-4 for token positions 304-1, 304-2, 304-3, 304-4, respectively, may be compared, at 318, against current adaptive entropy threshold 316. For example, for example token prediction 350, entropy score 310-1, generated for token position 304-1, may be compared to current adaptive entropy threshold 316 to determine if entropy score 310-1 satisfies the current adaptive entropy threshold 316 (e.g., determine if entropy score 310-1< current adaptive entropy threshold 316), and thus qualifies for parallel decoding. Similar comparison may be performed for token positions 304-2, 304-3, and in some cases, 304-4. In this example, at 318, it is determined that entropy score 310-1 and entropy score 310-2 satisfy the current adaptive entropy threshold (e.g., entropy score 310-1< current adaptive entropy threshold 316 and entropy score 310-2< current adaptive entropy threshold 316). Further, in this example, at 318, it is determined that entropy score 310-3 does not satisfy the current adaptive entropy threshold (e.g., entropy score 310-3< current adaptive entropy threshold 316). In this example, the comparison (e.g., at 318) may not be performed for token position 304-4 due to the entropy score 310-3 for token position 304-3 not satisfying the current adaptive entropy threshold 316, such that only contiguous tokens are decoded in parallel.

Because token positions 304-1 and 304-2 have entropy scores 310-1 and 310-2, respectively, that satisfy the current adaptive entropy threshold 316, set block decoding may be performed for token positions 304-1 and 304-2 to decode output tokens for token positions 304-1 and 304-2 in parallel.

Decoding output tokens for token positions 304-3 and 304-4 may occur in the same decoding cycle; however, tokens for token positions 304-3 and 304-4 may be decoded using single token decoding (instead of set block decoding). In other words, the remaining token positions in that same block (e.g., token positions 304-3 and 304-4) may be decoded immediately afterward using next-token prediction within the same decoding cycle.

It is noted that although FIG. 3B depicts sequential left-to-right decoding (e.g., for set block decoding of tokens in token positions 304-1 and 304-2), in some other examples, set block decoding may not require sequential left-to-right order decoding. In other words, any subset of token positions (e.g., in a block for a decoding cycle) may be decoded in parallel, and the remaining token positions may be decoded by next-token prediction or single token decoding in the same block/decoding cycle. When the entire block is exhausted, in a decoding cycle, the system may emit metric(s) to a reinforcement learning controller and begin the next decoding cycle.

As such, output tokens for token positions 304-1 and 304-2 may be generated as "Mount" and "Everet," respectively. These output tokens and the input token sequence 302 may be combined into a first version of the output token sequence 320 that reads "the tallest mountain above sea level is Mount Everest." In certain aspects, example process 300 for adaptive entropy threshold scheduling and example token prediction 350 may be repeated for one or more subsequent decoding cycles to decode tokens for the remaining token positions 304-3 and 304-3. After tokens for all token positions 304-1, 304-2, 304-3, and 304-4 have been generated, an end-of-sequence condition may be met, and a final output token sequence may be generated. In certain aspects, the final output token sequence may be generated for rendering on a UI of a computing device, such as UI 152 of client device 150 depicted and described with respect to FIG. 1.

Figure 4:
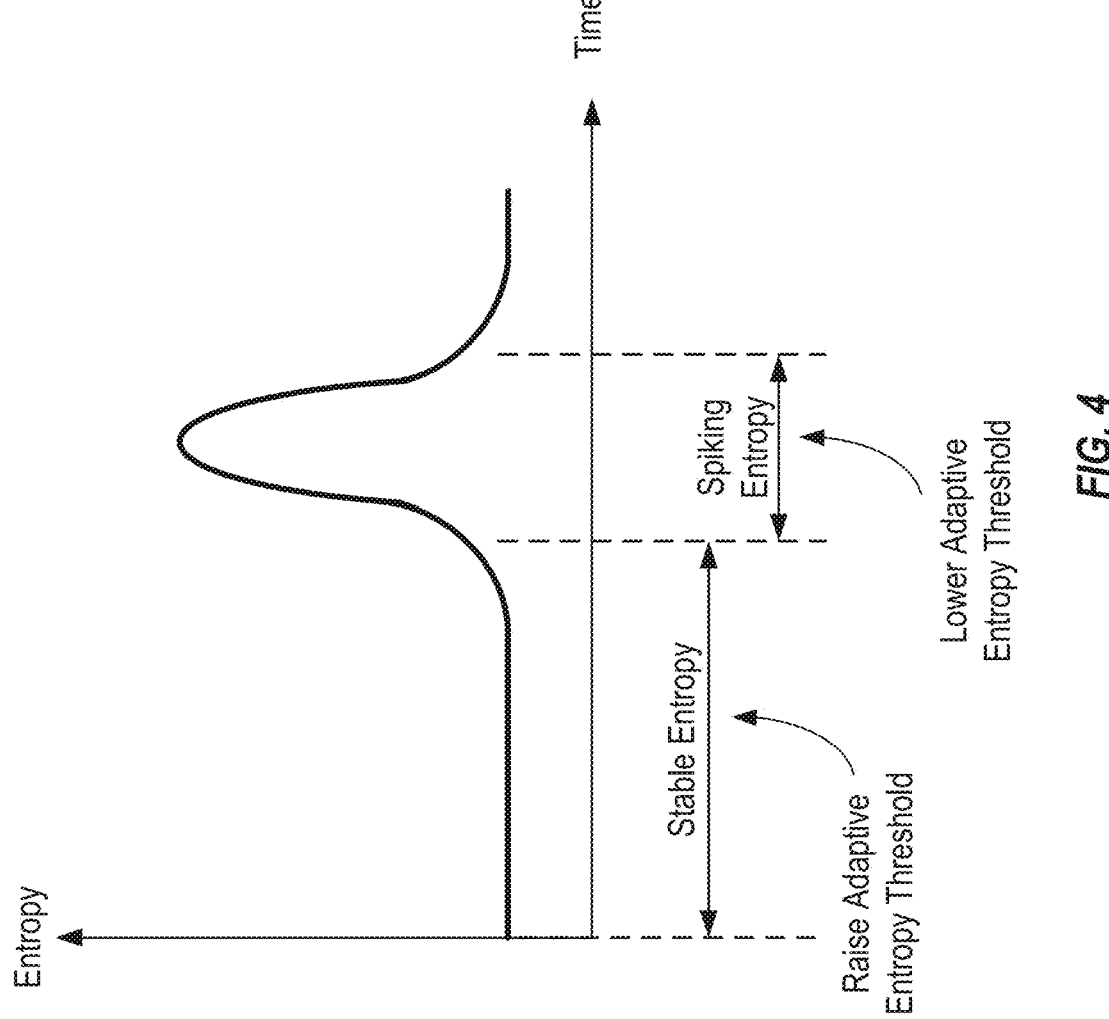
FIG. 4 depicts example dynamic change in language model uncertainty over time.

FIG. 4 depicts example dynamic change in language model uncertainty over time, represented by entropy scores generated across decoding cycles. As shown in FIG. 4, initially, entropy remains low and stable, corresponding to predictable text segments such as common phrases or punctuation. As the sequence transitions into a more complex segment, such as a numeric computation or syntax-sensitive code snippet, entropy spikes sharply, indicating increased uncertainty. Once the challenging segment is resolved (e.g., decoded), entropy returns to a lower and steadier range again.

An adaptive entropy threshold may be dynamically adjusted based on these changes. For example, when the entropy curve is stable, with a flat or gently declining slope, the adaptive entropy threshold may be increased to enable larger or more frequent parallel blocks in decoding. Conversely, when the curve spikes, showing a positive slope and elevated variance, the adaptive entropy threshold may be decreased. This reduction may constrain parallelism, thereby helping to ensure accuracy, such as by focusing on sequential decoding for positions with higher uncertainty. This adaptive behavior may provide a balance between decoding efficiency and prediction accuracy.

Example Method for Token Prediction

FIG. 5 depicts an example method 500 for token prediction. In one aspect, method 500 can be implemented by the system 200 of FIG. 2 and/or processing system 700 of FIG. 7.

Method 500 begins at block 505 with processing an input token sequence to generate, for each respective token position of a plurality of token positions in an output token sequence: a probability distribution for a set of candidate output tokens associated with the respective token position, wherein the probability distribution comprises a probability score for each respective candidate output token in the set of candidate output tokens; and an entropy score based on the probability distribution for the set of candidate output tokens.

Method 500 then proceeds to block 510 with determining, for each respective token position of a set of token positions from the plurality of token positions in the output token sequence, whether the entropy score associated with the respective token position satisfies a current adaptive entropy threshold, wherein the current adaptive entropy threshold is based on the entropy score associated with each token position of the plurality of token positions.

Method 500 then proceeds to block 515 with performing, based on the determination for each respective token position of the set of token positions, a decoding operation comprising: a set block decoding operation to generate at least two output tokens that correspond to at least a first token position and a second token position of the plurality of token positions in the output token sequence; or a single-token decoding operation to generate a single output token that corresponds to the first token position.

Method 500 then proceeds to block 520 with generating a first version of the output token sequence including the at least two output tokens or the single output token.

In some aspects, the set of token positions comprises at least two token positions, of the plurality of token positions, that correspond to at least the first token position and a second token position in the output token sequence, the decoding operation comprises the set block decoding operation based on the entropy score associated with each respective token position of at least two token positions satisfying the current adaptive entropy threshold, and block 520 includes generating the first version of the output token sequence with the at least two output tokens.

In some aspects, performing the set block decoding operation comprises decoding, in parallel, the sets of candidate output tokens corresponding to the at least two token positions to generate the at least two output tokens.

In some aspects, the set of token positions comprises the first token position and the second token position in the output token sequence, the decoding operation comprises the single-token decoding operation based on: the entropy score associated with the first token position satisfying the current adaptive entropy threshold; and the entropy score associated with the second token position not satisfying the current adaptive entropy threshold, and block 520 includes generating the first version of the output token sequence with the single output token.

In some aspects, the set of token positions comprises the first token position in the output token sequence, the decoding operation comprises the single-token decoding operation based on the entropy score associated with the first token position not satisfying the current adaptive entropy threshold, and block 520 includes generating the first version of the output token sequence with the single output token.

In some aspects, method 500 further includes determining a current decoding cycle entropy score based on the entropy score associated with each token position of the plurality of token positions.

In some aspects, method 500 further includes updating a sliding window of entropy scores to include the current decoding cycle entropy score, the sliding window of entropy scores comprising a plurality of previous decoding cycle entropy scores.

In some aspects, method 500 further includes determining one or more trend metrics based on the sliding window of entropy scores.

In some aspects, method 500 further includes determining the current adaptive entropy threshold based on the trend metrics.

In some aspects, the current decoding cycle entropy score comprises: a mean entropy score; a median entropy score; or a weighted aggregation entropy score.

In some aspects, the one or more trend metrics comprise at least one of: a slope; or a variance.

In some aspects, determining the current adaptive entropy threshold comprises determining a first mapping between the one or more trend metrics and the current adaptive entropy threshold.

In some aspects, determining the current adaptive entropy threshold comprises determining one or more rules.

In some aspects, determining the current adaptive entropy threshold comprises: determining at least one of the one or more trend metrics satisfies at least one threshold; and adjusting, based on the determination, a previous adaptive entropy threshold by an increment.

In some aspects, the one or more trend metrics comprise a slope, determining the at least one of the one or more trend metrics satisfies the at least one threshold comprises determining the slope is greater than a slope threshold, and adjusting the previous adaptive entropy threshold comprises decreasing the previous adaptive entropy threshold by the increment.

In some aspects, the one or more trend metrics comprise a slope, determining the at least one of the one or more trend metrics satisfies the at least one threshold comprises determining the slope is less than a slope threshold, and adjusting the previous adaptive entropy threshold comprises increasing the previous adaptive entropy threshold by the increment.

In some aspects, the method 500 further comprises obtaining decoding feedback for a plurality of previous decoding cycles associated with the plurality of previous decoding cycle entropy scores, and determining the current adaptive entropy threshold comprises adjusting a previous adaptive entropy threshold by an increment based on the decoding feedback.

In some aspects, the decoding feedback comprises information about at least one of the plurality of previous decoding cycle entropy scores; a latency metric associated with each respective previous decoding cycle of the plurality of previous decoding cycles; or an accuracy metric associated with each respective previous decoding cycle of the plurality of previous decoding cycles.

By leveraging method 500 for token prediction, significant technical advantages may be achieved. For example, method 500 provides a systematic approach to dynamically compute and adjust an adaptive entropy threshold based on trend metrics derived from a sliding window of entropy scores across decoding cycles. This adaptive entropy threshold is uniformly applied to qualify token positions for parallel or single-token decoding. Adaptive gating enables increased parallelization in low-uncertainty regions, reducing latency and computational costs, while restricting parallel decoding in high-uncertainty regions to ensure accuracy and coherence. The approach minimizes forward passes during inference, mitigates error propagation by deferring ambiguous positions, and eliminates manual tuning through real-time threshold scheduling. When optional decoding feedback, such as latency and accuracy metrics, is incorporated, method 500 further refines threshold adjustments over time, enhancing throughput without compromising correctness. Accordingly, the performance, reliability, and efficiency of AI-driven token prediction workflows may be enhanced, supporting robust, scalable deployments and improved user experience.

Note that FIG. 5 is just one example of a method, and other methods including fewer, additional, or alternative operations are possible consistent with this disclosure.

Example Method for Adaptive Entropy Threshold Adjustment

FIG. 6 depicts an example method 600 for adaptive entropy threshold adjustment for token prediction. In one aspect, method 600 can be implemented by the system 200 of FIG. 2 and/or processing system 800 of FIG. 8.

Method 600 begins at block 605 with processing an input token sequence to generate, for each respective token position of a plurality of token positions in an output token sequence: a probability distribution for a set of candidate output tokens associated with the respective token position, wherein the probability distribution comprises a probability score for each candidate output token in the set of candidate output tokens; and an entropy score based on the probability distribution for the set of candidate output tokens.

Method 600 then proceeds to block 610 with determining a current decoding cycle entropy score based on the entropy score associated with each token position of the plurality of token positions.

Method 600 then proceeds to block 615 with updating a sliding window of entropy scores to include the current decoding cycle entropy score, the sliding window of entropy scores comprising a plurality of previous decoding cycle entropy scores.

Method 600 then proceeds to block 620 with determining one or more trend metrics based on the sliding window of entropy scores.

Method 600 then proceeds to block 625 with determining a current adaptive entropy threshold based on the trend metrics.

Method 600 then proceeds to block 630 with predicting one or more tokens, associated with one or more token positions in the plurality of token positions, in the output token sequence based on the current adaptive entropy threshold.

In some aspects, the current decoding cycle entropy score comprises: a mean entropy score; a median entropy score; or a weighted aggregation entropy score.

In some aspects, the one or more trend metrics comprise at least one of: a slope; or a variance.

In some aspects, block 625 includes determining a first mapping between the one or more trend metrics and the current adaptive entropy threshold.

In some aspects, block 625 includes determining one or more rules.

In some aspects, block 625 includes: determining at least one of the one or more trend metrics satisfies at least one threshold; and adjusting, based on the determination, a previous adaptive entropy threshold by an increment.

In some aspects, the one or more trend metrics comprise a slope, determining the at least one of the one or more trend metrics satisfies the at least one threshold comprises determining the slope is greater than a slope threshold, and adjusting the previous adaptive entropy threshold comprises decreasing the previous adaptive entropy threshold by the increment.

In some aspects, the one or more trend metrics comprise a slope, determining the at least one of the one or more trend metrics satisfies the at least one threshold comprises determining the slope is less than a slope threshold, and adjusting the previous adaptive entropy threshold comprises increasing the previous adaptive entropy threshold by the increment.

In some aspects, the method 600 further comprises obtaining decoding feedback for a plurality of previous decoding cycles associated with the plurality of previous decoding cycle entropy scores, and block 625 includes adjusting a previous adaptive entropy threshold by an increment based on the decoding feedback.

In some aspects, the decoding feedback comprises information about at least one of: the plurality of previous decoding cycle entropy scores; a latency metric associated with each respective previous decoding cycle of the plurality of previous decoding cycles; or an accuracy metric associated with each respective previous decoding cycle of the plurality of previous decoding cycles.

By leveraging method 600 for adaptive entropy threshold adjustment, significant technical advantages may be achieved. For example, method 600 enables dynamic computation and adjustment of an adaptive entropy threshold based on trend metrics derived from a sliding window of entropy scores across decoding cycles. This threshold is applied to qualify token positions for prediction, allowing for parallel decoding in low-uncertainty regions to reduce latency and computational costs, while restricting decoding in high-uncertainty regions to ensure accuracy and coherence. The approach minimizes error propagation, eliminates manual tuning through real-time threshold scheduling, and, in some cases, incorporates decoding feedback, such as latency and accuracy metrics, to refine adjustments over time. Accordingly, method 600 enhances the performance, reliability, and efficiency of token prediction workflows, supporting robust and scalable deployments across diverse applications.

Note that FIG. 6 is just one example of a method, and other methods including fewer, additional, or alternative operations are possible consistent with this disclosure.

Example Processing System for Token Prediction

Figure 7:
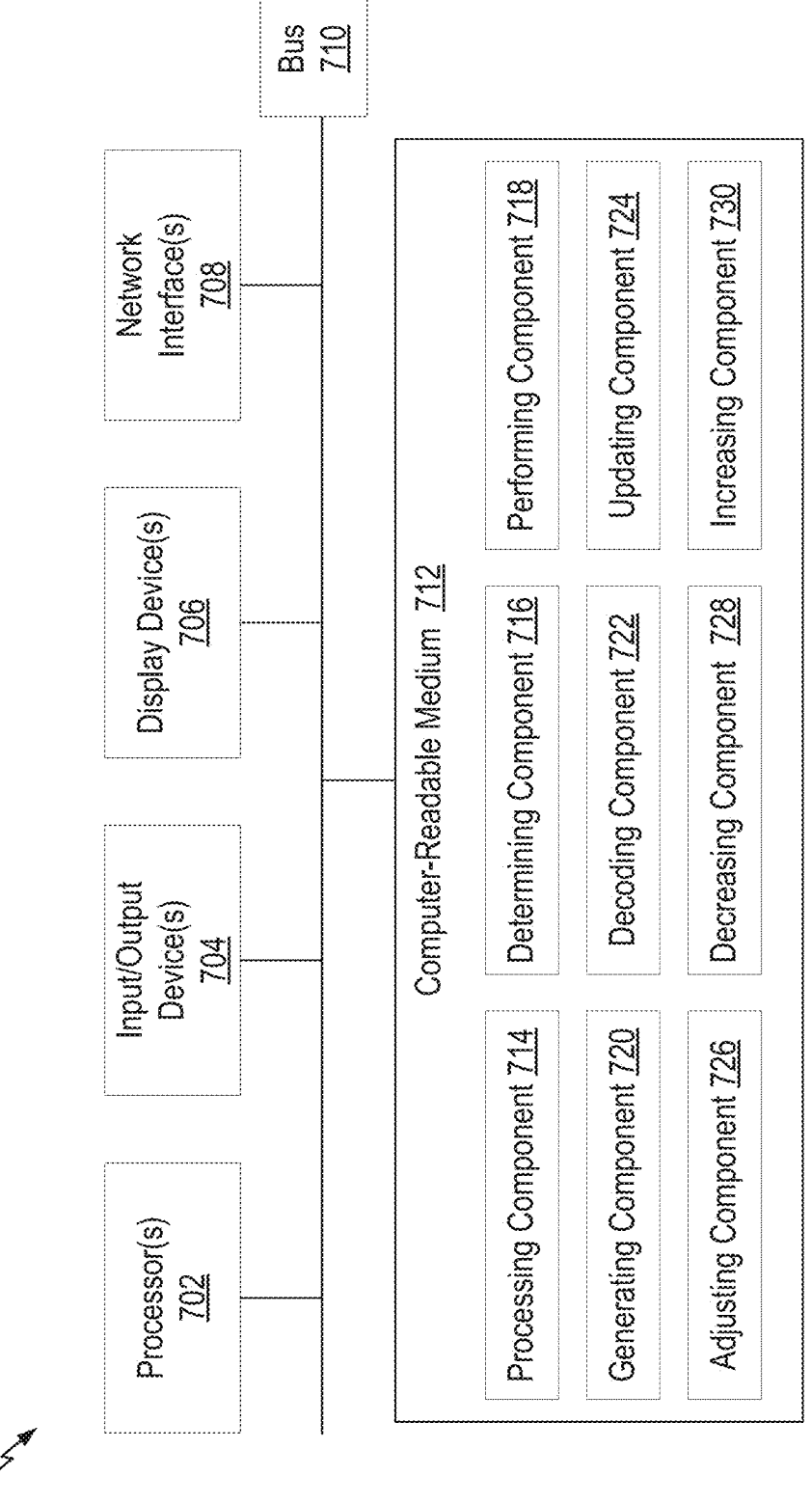
FIG. 7 depicts an example processing system with which aspects of the present disclosure can be performed.

FIG. 7 depicts an example processing system 700 configured to perform various aspects described herein, including, for example, method 500 as described above with respect to FIG. 5.

Processing system 700 is an example of an electronic device configured to execute computer-executable instructions, such as those derived from compiled computer code, including without limitation personal computers, tablet computers, servers, smart phones, smart devices, wearable devices, augmented and/or virtual reality devices, and others.

In the depicted example, processing system 700 includes one or more processors 702, one or more input/output devices 704, one or more display devices 706, one or more network interfaces 708 through which processing system 700 is connected to one or more networks (e.g., a local network, an intranet, the Internet, or any other group of processing systems communicatively connected to each other), and computer-readable medium 712. In the depicted example, the aforementioned components are coupled by a bus 710, which may generally be configured for data exchange amongst the components. Bus 710 may be representative of multiple buses, while only one is depicted for simplicity.

Processor(s) 702 are generally configured to retrieve and execute instructions stored in one or more memories, including local memories like computer-readable medium 712, as well as remote memories and data stores. Similarly, processor(s) 702 are configured to store application data residing in local memories like the computer-readable medium 712, as well as remote memories and data stores. More generally, bus 710 is configured to transmit programming instructions and application data among the processor(s) 702, display device(s) 706, network interface(s) 708, and/or computer-readable medium 712. In certain embodiments, processor(s) 702 are representative of one or more central processing units (CPUs), graphics processing unit (GPUs), tensor processing unit (TPUs), accelerators, and other processing devices.

Input/output device(s) 704 may include any device, mechanism, system, interactive display, and/or various other hardware and software components for communicating information between processing system 700 and a user of processing system 700. For example, input/output device(s) 704 may include input hardware, such as a keyboard, touch screen, button, microphone, speaker, and/or other device for receiving inputs from the user and sending outputs to the user.

Display device(s) 706 may generally include any sort of device configured to display data, information, graphics, user interface elements, and the like to a user. For example, display device(s) 706 may include internal and external displays such as an internal display of a tablet computer or an external display for a server computer or a projector. Display device(s) 706 may further include displays for devices, such as augmented, virtual, and/or extended reality devices. In various embodiments, display device(s) 706 may be configured to display a graphical user interface.

Network interface(s) 708 provide processing system 700 with access to external networks and thereby to external processing systems. Network interface(s) 708 can generally be any hardware and/or software capable of transmitting and/or receiving data via a wired or wireless network connection. Accordingly, network interface(s) 708 can include a communication transceiver for sending and/or receiving any wired and/or wireless communication.

Computer-readable medium 712 may be a volatile memory, such as a random access memory (RAM), or a nonvolatile memory, such as nonvolatile random access memory (NVRAM), or the like. In this example, computer-readable medium 712 includes processing component 714, determining component 716, performing component 718, generating component 720, decoding component 722, updating component 724, adjusting component 726, decreasing component 728, increasing component 730. Processing of the components 714-730 may enable and cause the processing system 700 to perform the method 500 described with respect to FIG. 5, or any aspect related to it.

In certain embodiments, processing component 714 is configured to process an input token sequence to generate, for each respective token position of a plurality of token positions in an output token sequence: a probability distribution for a set of candidate output tokens associated with the respective token position, wherein the probability distribution comprises a probability score for each respective candidate output token in the set of candidate output tokens; and an entropy score based on the probability distribution for the set of candidate output tokens, as described in FIG. 5 with reference to block 505. In certain embodiments, determining component 716 is configured to determine, for each respective token position of a set of token positions from the plurality of token positions in the output token sequence, whether the entropy score associated with the respective token position satisfies a current adaptive entropy threshold, wherein the current adaptive entropy threshold is based on the entropy score associated with each token position of the plurality of token positions, as described in FIG. 5 with reference to block 510. In certain embodiments, performing component 718 is configured to perform, based on the determination for each respective token position of the set of token positions, a decoding operation comprising: a set block decoding operation to generate at least two output tokens that correspond to at least a first token position and a second token position of the plurality of token positions in the output token sequence; or a single-token decoding operation to generate a single output token that corresponds to the first token position, as described in FIG. 5 with reference to block 515. In certain embodiments, generating component 720 is configured to generate a first version of the output token sequence including the at least two output tokens or the single output token, as described in FIG. 5 with reference to block 520.

Note that FIG. 7 is just one example of a processing system consistent with aspects described herein, and other processing systems having additional, alternative, or fewer components are possible consistent with this disclosure.

Example Processing System for Adaptive Entropy Threshold Adjustment

Figure 8:
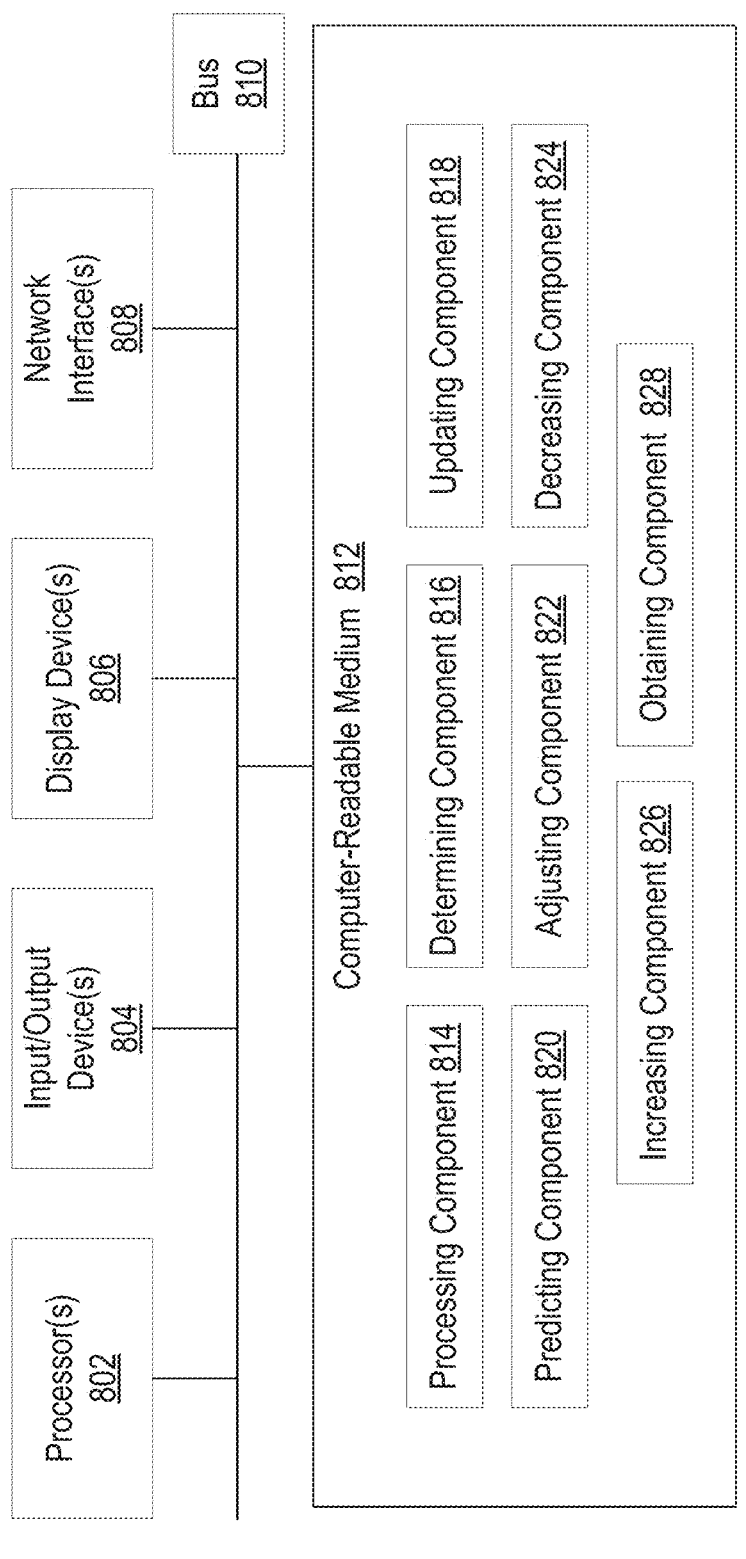
FIG. 8 depicts another example processing system with which aspects of the present disclosure can be performed.

FIG. 8 depicts an example processing system 800 configured to perform various aspects described herein, including, for example, method 600 as described above with respect to FIG. 6.

Processing system 800 is an example of an electronic device configured to execute computer-executable instructions, such as those derived from compiled computer code, including without limitation personal computers, tablet computers, servers, smart phones, smart devices, wearable devices, augmented and/or virtual reality devices, and others.

In the depicted example, processing system 800 includes one or more processors 802, one or more input/output devices 804, one or more display devices 806, one or more network interfaces 808 through which processing system 800 is connected to one or more networks (e.g., a local network, an intranet, the Internet, or any other group of processing systems communicatively connected to each other), and computer-readable medium 812. In the depicted example, the aforementioned components are coupled by a bus 810, which may generally be configured for data exchange amongst the components. Bus 810 may be representative of multiple buses, while only one is depicted for simplicity.

Processor(s) 802 are generally configured to retrieve and execute instructions stored in one or more memories, including local memories like computer-readable medium 812, as well as remote memories and data stores. Similarly, processor(s) 802 are configured to store application data residing in local memories like the computer-readable medium 812, as well as remote memories and data stores. More generally, bus 810 is configured to transmit programming instructions and application data among the processor(s) 802, display device(s) 806, network interface(s) 808, and/or computer-readable medium 812. In certain embodiments, processor(s) 802 are representative of one or more central processing units (CPUs), graphics processing unit (GPUs), tensor processing unit (TPUs), accelerators, and other processing devices.

Input/output device(s) 804 may include any device, mechanism, system, interactive display, and/or various other hardware and software components for communicating information between processing system 800 and a user of processing system 800. For example, input/output device(s) 804 may include input hardware, such as a keyboard, touch screen, button, microphone, speaker, and/or other device for receiving inputs from the user and sending outputs to the user.

Display device(s) 806 may generally include any sort of device configured to display data, information, graphics, user interface elements, and the like to a user. For example, display device(s) 806 may include internal and external displays such as an internal display of a tablet computer or an external display for a server computer or a projector. Display device(s) 806 may further include displays for devices, such as augmented, virtual, and/or extended reality devices. In various embodiments, display device(s) 806 may be configured to display a graphical user interface.

Network interface(s) 808 provide processing system 800 with access to external networks and thereby to external processing systems. Network interface(s) 808 can generally be any hardware and/or software capable of transmitting and/or receiving data via a wired or wireless network connection. Accordingly, network interface(s) 808 can include a communication transceiver for sending and/or receiving any wired and/or wireless communication.

Computer-readable medium 812 may be a volatile memory, such as a random access memory (RAM), or a nonvolatile memory, such as nonvolatile random access memory (NVRAM), or the like. In this example, computer-readable medium 812 includes processing component 814, determining component 816, updating component 818, predicting component 820, adjusting component 822, decreasing component 824, increasing component 826, and obtaining component 828. Processing of the components 814-828 may enable and cause the processing system 800 to perform the method 600 described with respect to FIG. 6, or any aspect related to it.

In certain embodiments, processing component 814 is configured to process an input token sequence to generate, for each respective token position of a plurality of token positions in an output token sequence: a probability distribution for a set of candidate output tokens associated with the respective token position, wherein the probability distribution comprises a probability score for each candidate output token in the set of candidate output tokens; and an entropy score based on the probability distribution for the set of candidate output tokens, as described in FIG. 6 with reference to block 605. In certain embodiments, determining component 816 is configured to determine a current decoding cycle entropy score based on the entropy score associated with each token position of the plurality of token positions, as described in FIG. 6 with reference to block 610. In certain embodiments, updating component 818 is configured to update a sliding window of entropy scores to include the current decoding cycle entropy score, the sliding window of entropy scores comprising a plurality of previous decoding cycle entropy scores, as described in FIG. 6 with reference to block 615. In certain embodiments, determining component 816 is configured to determine one or more trend metrics based on the sliding window of entropy scores, as described in FIG. 6 with reference to block 620. In certain embodiments, determining component 816 is configured to determine a current adaptive entropy threshold based on the trend metrics, as described in FIG. 6 with reference to block 625. In certain embodiments, predicting component 820 is configured to predict one or more tokens, associated with one or more token positions in the plurality of token positions, in the output token sequence based on the current adaptive entropy threshold, as described in FIG. 6 with reference to block 630.

Note that FIG. 8 is just one example of a processing system consistent with aspects described herein, and other processing systems having additional, alternative, or fewer components are possible consistent with this disclosure.

Example Clauses

Implementation examples are described in the following numbered clauses:

Clause 1: A method of token prediction, comprising: processing an input token sequence to generate, for each respective token position of a plurality of token positions in an output token sequence: a probability distribution for a set of candidate output tokens associated with the respective token position, wherein the probability distribution comprises a probability score for each respective candidate output token in the set of candidate output tokens; and an entropy score based on the probability distribution for the set of candidate output tokens; determining, for each respective token position of a set of token positions from the plurality of token positions in the output token sequence, whether the entropy score associated with the respective token position satisfies a current adaptive entropy threshold, wherein the current adaptive entropy threshold is based on the entropy score associated with each token position of the plurality of token positions; performing, based on the determination for each respective token position of the set of token positions, a decoding operation comprising: a set block decoding operation to generate at least two output tokens that correspond to at least a first token position and a second token position of the plurality of token positions in the output token sequence; or a single-token decoding operation to generate a single output token that corresponds to the first token position; and generating a first version of the output token sequence including the at least two output tokens or the single output token.

Clause 2: The method of Clause 1, wherein: the set of token positions comprises at least two token positions, of the plurality of token positions, that correspond to at least the first token position and a second token position in the output token sequence, the decoding operation comprises the set block decoding operation based on the entropy score associated with each respective token position of at least two token positions satisfying the current adaptive entropy threshold, and generating the first version of the output token sequence comprises generating the first version of the output token sequence with the at least two output tokens.

Clause 3: The method of Clause 2, wherein performing the set block decoding operation comprises decoding, in parallel, the sets of candidate output tokens corresponding to the at least two token positions to generate the at least two output tokens.

Clause 4: The method of any one of Clauses 1-3, wherein: the set of token positions comprises the first token position and the second token position in the output token sequence, the decoding operation comprises the single-token decoding operation based on: the entropy score associated with the first token position satisfying the current adaptive entropy threshold; and the entropy score associated with the second token position not satisfying the current adaptive entropy threshold, and generating the first version of the output token sequence comprises generating the first version of the output token sequence with the single output token.

Clause 5: The method of any one of Clauses 1-4, wherein: the set of token positions comprises the first token position in the output token sequence, the decoding operation comprises the single-token decoding operation based on the entropy score associated with the first token position not satisfying the current adaptive entropy threshold, and generating the first version of the output token sequence comprises generating the first version of the output token sequence with the single output token.

Clause 6: The method of any one of Clauses 1-5, further comprising: determining a current decoding cycle entropy score based on the entropy score associated with each token position of the plurality of token positions; updating a sliding window of entropy scores to include the current decoding cycle entropy score, the sliding window of entropy scores comprising a plurality of previous decoding cycle entropy scores; determining one or more trend metrics based on the sliding window of entropy scores; and determining the current adaptive entropy threshold based on the trend metrics.

Clause 7: The method of Clause 6, wherein the current decoding cycle entropy score comprises: a mean entropy score; a median entropy score; or a weighted aggregation entropy score.

Clause 8: The method of Clause 6, wherein the one or more trend metrics comprise at least one of: a slope; or a variance.

Clause 9: The method of Clause 6, wherein determining the current adaptive entropy threshold comprises determining a first mapping between the one or more trend metrics and the current adaptive entropy threshold.

Clause 10: The method of Clause 6, wherein determining the current adaptive entropy threshold comprises determining one or more rules.

Clause 11: The method of Clause 6, wherein determining the current adaptive entropy threshold comprises: determining at least one of the one or more trend metrics satisfies at least one threshold; and adjusting, based on the determination, a previous adaptive entropy threshold by an increment.

Clause 12: The method of Clause 11, wherein: the one or more trend metrics comprise a slope, determining the at least one of the one or more trend metrics satisfies the at least one threshold comprises determining the slope is greater than a slope threshold, and adjusting the previous adaptive entropy threshold comprises decreasing the previous adaptive entropy threshold by the increment.

Clause 13: The method of Clause 11, wherein: the one or more trend metrics comprise a slope, determining the at least one of the one or more trend metrics satisfies the at least one threshold comprises determining the slope is less than a slope threshold, and adjusting the previous adaptive entropy threshold comprises increasing the previous adaptive entropy threshold by the increment.

Clause 14: The method of Clause 6, wherein: the method further comprises obtaining decoding feedback for a plurality of previous decoding cycles associated with the plurality of previous decoding cycle entropy scores, and determining the current adaptive entropy threshold comprises adjusting a previous adaptive entropy threshold by an increment based on the decoding feedback.

Clause 15: The method of Clause 14, wherein the decoding feedback comprises information about at least one of: the plurality of previous decoding cycle entropy scores; a latency metric associated with each respective previous decoding cycle of the plurality of previous decoding cycles; or an accuracy metric associated with each respective previous decoding cycle of the plurality of previous decoding cycles.

Clause 16: A method of adaptive entropy threshold adjustment for token prediction, comprising: processing an input token sequence to generate, for each respective token position of a plurality of token positions in an output token sequence: a probability distribution for a set of candidate output tokens associated with the respective token position, wherein the probability distribution comprises a probability score for each candidate output token in the set of candidate output tokens; and an entropy score based on the probability distribution for the set of candidate output tokens; determining a current decoding cycle entropy score based on the entropy score associated with each token position of the plurality of token positions; updating a sliding window of entropy scores to include the current decoding cycle entropy score, the sliding window of entropy scores comprising a plurality of previous decoding cycle entropy scores; determining one or more trend metrics based on the sliding window of entropy scores; determining a current adaptive entropy threshold based on the trend metrics; and predicting one or more tokens, associated with one or more token positions in the plurality of token positions, in the output token sequence based on the current adaptive entropy threshold.

Clause 17: The method of Clause 16, wherein the current decoding cycle entropy score comprises: a mean entropy score; a median entropy score; or a weighted aggregation entropy score.

Clause 18: The method of any one of Clauses 16-17, wherein the one or more trend metrics comprise at least one of: a slope; or a variance.

Clause 19: The method of any one of Clauses 16-18, wherein determining the current adaptive entropy threshold comprises determining a first mapping between the one or more trend metrics and the current adaptive entropy threshold.

Clause 20: The method of any one of Clauses 16-19, wherein determining the current adaptive entropy threshold comprises determining one or more rules.

Clause 21: The method of any one of Clauses 16-20, wherein determining the current adaptive entropy threshold comprises: determining at least one of the one or more trend metrics satisfies at least one threshold; and adjusting, based on the determination, a previous adaptive entropy threshold by an increment.

Clause 22: The method of Clause 21, wherein: the one or more trend metrics comprise a slope, determining the at least one of the one or more trend metrics satisfies the at least one threshold comprises determining the slope is greater than a slope threshold, and adjusting the previous adaptive entropy threshold comprises decreasing the previous adaptive entropy threshold by the increment.

Clause 23: The method of Clause 21, wherein: the one or more trend metrics comprise a slope, determining the at least one of the one or more trend metrics satisfies the at least one threshold comprises determining the slope is less than a slope threshold, and adjusting the previous adaptive entropy threshold comprises increasing the previous adaptive entropy threshold by the increment.

Clause 24: The method of any one of Clauses 16-23, wherein: the method further comprises obtaining decoding feedback for a plurality of previous decoding cycles associated with the plurality of previous decoding cycle entropy scores, and determining the current adaptive entropy threshold comprises adjusting a previous adaptive entropy threshold by an increment based on the decoding feedback.

Clause 25: The method of Clause 24, wherein the decoding feedback comprises information about at least one of: the plurality of previous decoding cycle entropy scores; a latency metric associated with each respective previous decoding cycle of the plurality of previous decoding cycles; or an accuracy metric associated with each respective previous decoding cycle of the plurality of previous decoding cycles.

Clause 26: A processing system, comprising: memory comprising computer-executable instructions; and one or more processors configured to execute the computer-executable instructions and cause the processing system to perform a method in accordance with any one of Clauses 1-25.

Clause 27: A processing system, comprising means for performing a method in accordance with any one of Clauses 1-25.

Clause 28: A non-transitory computer-readable medium storing program code for causing a processing system to perform the steps of any one of Clauses 1-25.

Clause 29: A computer program product embodied on a computer-readable storage medium comprising code for performing a method in accordance with any one of Clauses 1-25.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of token prediction, comprising:
processing an input token sequence to generate, for each respective token position of a plurality of token positions in an output token sequence:
a probability distribution for a set of candidate output tokens associated with the respective token position, wherein the probability distribution comprises a probability score for each respective candidate output token in the set of candidate output tokens; and
an entropy score based on the probability distribution for the set of candidate output tokens;
for each respective token position of a set of token positions from the plurality of token positions in the output token sequence, determining whether the entropy score associated with the respective token position satisfies a current adaptive entropy threshold, wherein the current adaptive entropy threshold is based on the entropy score associated with each token position of the plurality of token positions;
based on the determination for each respective token position of the set of token positions, performing a decoding operation comprising:
a set block decoding operation to generate at least two output tokens that correspond to at least a first token position and a second token position of the plurality of token positions in the output token sequence; or
a single-token decoding operation to generate a single output token that corresponds to the first token position; and
generating a first version of the output token sequence including the at least two output tokens or the single output token.

2. The method of claim 1, wherein:
the set of token positions comprises at least two token positions, of the plurality of token positions, that correspond to at least the first token position and a second token position in the output token sequence,
the decoding operation comprises the set block decoding operation based on the entropy score associated with each respective token position of at least two token positions satisfying the current adaptive entropy threshold, and generating the first version of the output token sequence comprises generating the first version of the output token sequence with the at least two output tokens.

3. The method of claim 2, wherein performing the set block decoding operation comprises decoding, in parallel, the sets of candidate output tokens corresponding to the at least two token positions to generate the at least two output tokens.

4. The method of claim 1, wherein:

the set of token positions comprises the first token position and the second token position in the output token sequence, the decoding operation comprises the single-token decoding operation based on:

the entropy score associated with the first token position satisfying the current adaptive entropy threshold; and the entropy score associated with the second token position not satisfying the current adaptive entropy threshold, and generating the first version of the output token sequence comprises generating the first version of the output token sequence with the single output token.

5. The method of claim 1, wherein:

the set of token positions comprises the first token position in the output token sequence, the decoding operation comprises the single-token decoding operation based on the entropy score associated with the first token position not satisfying the current adaptive entropy threshold, and generating the first version of the output token sequence comprises generating the first version of the output token sequence with the single output token.

6. The method of claim 1, further comprising:

determining a current decoding cycle entropy score based on the entropy score associated with each token position of the plurality of token positions;

updating a sliding window of entropy scores to include the current decoding cycle entropy score, the sliding window of entropy scores comprising a plurality of previous decoding cycle entropy scores;

determining one or more trend metrics based on the sliding window of entropy scores; and determining the current adaptive entropy threshold based on the trend metrics.

7. The method of claim 6, wherein the current decoding cycle entropy score comprises:

a mean entropy score;

a median entropy score; or a weighted aggregation entropy score.

8. The method of claim 6, wherein the one or more trend metrics comprise at least one of:

a slope; or a variance.

9. The method of claim 6, wherein determining the current adaptive entropy threshold comprises determining a first mapping between the one or more trend metrics and the current adaptive entropy threshold.

10. The method of claim 6, wherein determining the current adaptive entropy threshold comprises determining one or more rules.

11. The method of claim 6, wherein determining the current adaptive entropy threshold comprises:

determining at least one of the one or more trend metrics satisfies at least one threshold; and adjusting, based on the determination, a previous adaptive entropy threshold by an increment.

12. The method of claim 11, wherein:

the one or more trend metrics comprise a slope, determining the at least one of the one or more trend metrics satisfies the at least one threshold comprises determining the slope is greater than a slope threshold, and adjusting the previous adaptive entropy threshold comprises decreasing the previous adaptive entropy threshold by the increment.

13. The method of claim 11, wherein:

the one or more trend metrics comprise a slope, determining the at least one of the one or more trend metrics satisfies the at least one threshold comprises determining the slope is less than a slope threshold, and adjusting the previous adaptive entropy threshold comprises increasing the previous adaptive entropy threshold by the increment.

14. The method of claim 6, wherein:

the method further comprises obtaining decoding feedback for a plurality of previous decoding cycles associated with the plurality of previous decoding cycle entropy scores, and determining the current adaptive entropy threshold comprises adjusting a previous adaptive entropy threshold by an increment based on the decoding feedback.

15. The method of claim 14, wherein the decoding feedback comprises information about at least one of:

the plurality of previous decoding cycle entropy scores;

a latency metric associated with each respective previous decoding cycle of the plurality of previous decoding cycles; or an accuracy metric associated with each respective previous decoding cycle of the plurality of previous decoding cycles.

16. A method of adaptive entropy threshold adjustment for token prediction, comprising:

processing an input token sequence to generate, for each respective token position of a plurality of token positions in an output token sequence:

a probability distribution for a set of candidate output tokens associated with the respective token position, wherein the probability distribution comprises a probability score for each candidate output token in the set of candidate output tokens; and an entropy score based on the probability distribution for the set of candidate output tokens;

determining a current decoding cycle entropy score based on the entropy score associated with each token position of the plurality of token positions;

updating a sliding window of entropy scores to include the current decoding cycle entropy score, the sliding window of entropy scores comprising a plurality of previous decoding cycle entropy scores;

determining one or more trend metrics based on the sliding window of entropy scores;

determining a current adaptive entropy threshold based on the trend metrics; and predicting one or more tokens, associated with one or more token positions in the plurality of token positions, in the output token sequence based on the current adaptive entropy threshold.

17. The method of claim 16, wherein the current decoding cycle entropy score comprises:

a mean entropy score;

a median entropy score; or a weighted aggregation entropy score.

18. The method of claim 16, wherein the one or more trend metrics comprise at least one of:

a slope; or a variance.

19. The method of claim 16, wherein:

the method further comprises obtaining decoding feedback for a plurality of previous decoding cycles associated with the plurality of previous decoding cycle entropy scores, and determining the current adaptive entropy threshold comprises adjusting a previous adaptive entropy threshold by an increment based on the decoding feedback.

20. A processing system, comprising: memory comprising computer-executable instructions; and one or more processors configured to execute the computer-executable instructions and cause the processing system to:

process an input token sequence to generate, for each respective token position of a plurality of token positions in an output token sequence:

a probability distribution for a set of candidate output tokens associated with the respective token position, wherein the probability distribution comprises a probability score for each respective candidate output token in the set of candidate output tokens; and an entropy score based on the probability distribution for the set of candidate output tokens;

for each respective token position of a set of token positions from the plurality of token positions in the output token sequence, determine whether the entropy score associated with the respective token position satisfies a current adaptive entropy threshold, wherein the current adaptive entropy threshold is based on the entropy score associated with each token position of the plurality of token positions;

based on the determination for each respective token position of the set of token positions, perform a decoding operation comprising:

a set block decoding operation to generate at least two output tokens that correspond to at least a first token position and a second token position of the plurality of token positions in the output token sequence; or a single-token decoding operation to generate a single output token that corresponds to the first token position; and generate a first version of the output token sequence including the at least two output tokens or the single output token.

* * * * *